(12) United States Patent
Thawakar et al.

(10) Patent No.: US 12,657,917 B2
(45) Date of Patent: Jun. 16, 2026

(54) SYSTEM AND METHOD FOR VIDEO INSTANCE SEGMENTATION VIA RECURRENT ENCODER-BASED TRANSFORMERS

(71) Applicants:Mohamed bin Zayed University of Artificial Intelligence, Abu Dhabi (AE); Yeda Research and Development Co., Ltd, Rehovot (IL)

(72) Inventors: Omkar Thawakar, Abu Dhabi (AE); Alexandre Rivkind, Rehovot (IL); Ehud Ahissar, Rehovot (IL); Fahad Khan, Abu Dhabi (AE)

(73) Assignees: Mohamed bin Zayed University of Artificial Intelligence, Abu Dhabi (AE); Yeda Research and Development Co., Ltd, Rehovot (IL)

( * ) Notice: Subject to any disclaimer, the term of this patent is extended or adjusted under 35 U.S.C. 154(b) by 273 days.

(21) Appl. No.: 18/435,537

(22) Filed: Feb. 7, 2024

(65) Prior Publication Data

US 2025/0252740 A1 Aug. 7, 2025

(51) Int. Cl.
*G06V 20/40* (2022.01)
*G06V 10/77* (2022.01)
(Continued)

(52) U.S. Cl.
CPC .......... *G06V 20/49* (2022.01); *G06V 10/7715* (2022.01); *G06V 10/774* (2022.01); *G06V 10/82* (2022.01); *G06V 20/46* (2022.01)

(58) Field of Classification Search
CPC ........ G06V 20/49; G06V 20/46; G06V 10/82; G06V 10/7715; G06V 10/774
See application file for complete search history.

(56) References Cited

U.S. PATENT DOCUMENTS

| | | | | | |
|---|---|---|---|---|---|
| 2025/0166130 A1* | 5/2025 | Rai | ........................... | G06T 5/60 |
| 2025/0245966 A1* | 7/2025 | Zhang | ................ | G06V 10/7715 |

FOREIGN PATENT DOCUMENTS

| | | | | |
|---|---|---|---|---|
| CN | 113688871 B | 7/2022 | | |
| CN | 116187439 A | 5/2023 | | |
| WO | WO-2022195303 A1 * | 9/2022 | ....... | G06F 18/24133 |

OTHER PUBLICATIONS

Barbosa et al., "A Threefold Review on Deep Semantic Segmentation: Efficiency-oriented, Temporal and Depth-aware design," arXiv:2303.04315v1 [cs.CV], Mar. 8, 2023, https://doi.org/10.48550/arXiv.2303.04315 (Year: 2023).*

(Continued)

*Primary Examiner* — Michelle M Koeth
(74) *Attorney, Agent, or Firm* — Oblon, McClelland, Maier & Neustadt, L.L.P.

(57) ABSTRACT

A method and system for video instance segmentation includes a recurrent encoder-based network trained by knowledge distillation from a transformer encoder. Real time performance is achieved by replacing the transformer encoder with the trained recurrent encoder for inference. The system includes a video camera to capture a sequence of video frames, a machine learning processing engine for video instance segmentation, and a video output for outputting a sequence of mask instances. The machine learning processing engine is configured with an interchangeable encoder module. During inference, the encoder module is configured with a recurrent encoder having a combination of convolutional and recurrent layers, The recurrent layers capture temporal relationships between the video frames. During training, the encoder module is configured with a teacher transformer encoder for training the recurrent (Continued)

encoder as a student through knowledge distillation. A transformer decoder outputs video instance mask predictions.

20 Claims, 18 Drawing Sheets

(51) Int. Cl.
   *G06V 10/774*          (2022.01)
   *G06V 10/82*           (2022.01)

(56)                    References Cited

OTHER PUBLICATIONS

Li, et al., "TOIST: Task Oriented Instance Segmentation Transformer with Noun-Pronoun Distillation," 36th Conference on Neural Information Processing Systems (NeurIPS 2022), arXiv:2210.10775v1 [cs CV], Oct. 19, 2022, pp. 1-39 (Year: 2022).*

Pengfei Li, et al., "TOIST: Task Oriented Instance Segmentation Transformer with Noun-Pronoun Distillation", 36th Conference on Neural Information Processing Systems (NeurIPS 2022), arXiv:2210.10775v1 [cs.CV], Oct. 19, 2022, pp. 1-39.

Roy Miles, et al., "Mobile VOS: Real-Time Video Object Segmentation Contrastive Learning meets Knowledge Distillation", Proceedings of the IEEE/CVF Conference on Computer Vision and Pattern Recognition (CVPR'23), arXiv:2303.07815v1 [cs.CV], Mar. 14, 2023, pp. 1-15.

* cited by examiner 702    702                          700

702    702                          700

702    702                          700

702    702                          700

702     702     700

702     702     700

702     702     700

702     702     702     700

702

700

702

700

702

700

702

700

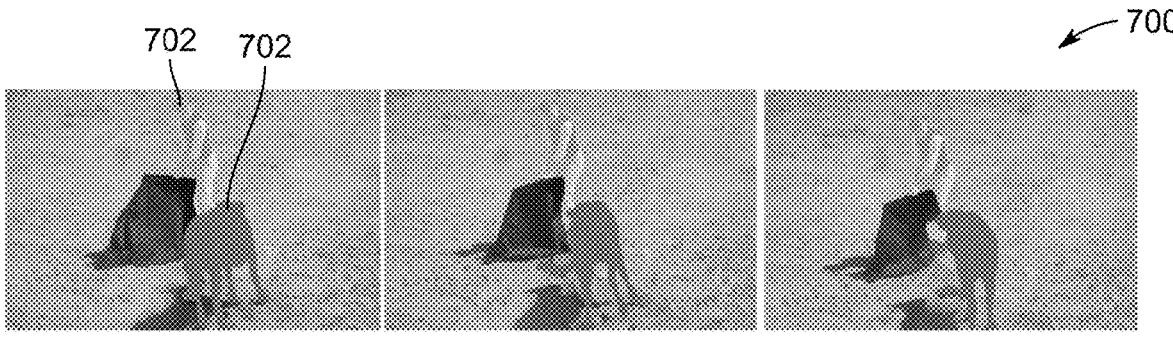
FIG. 7Q
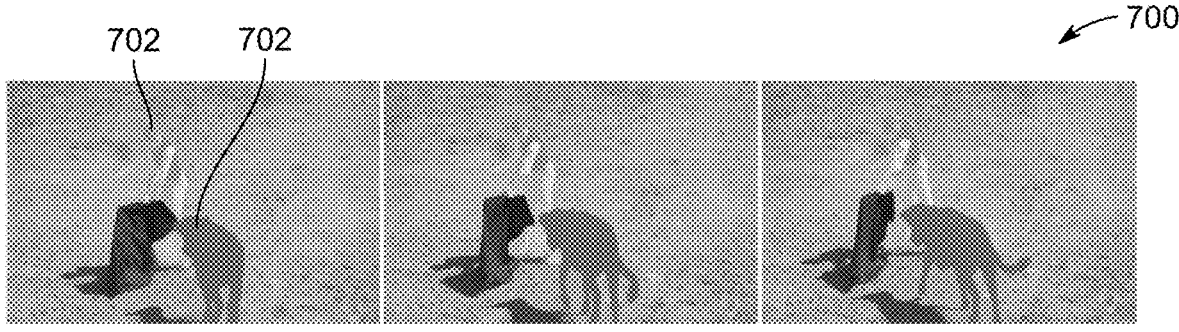
FIG. 7R
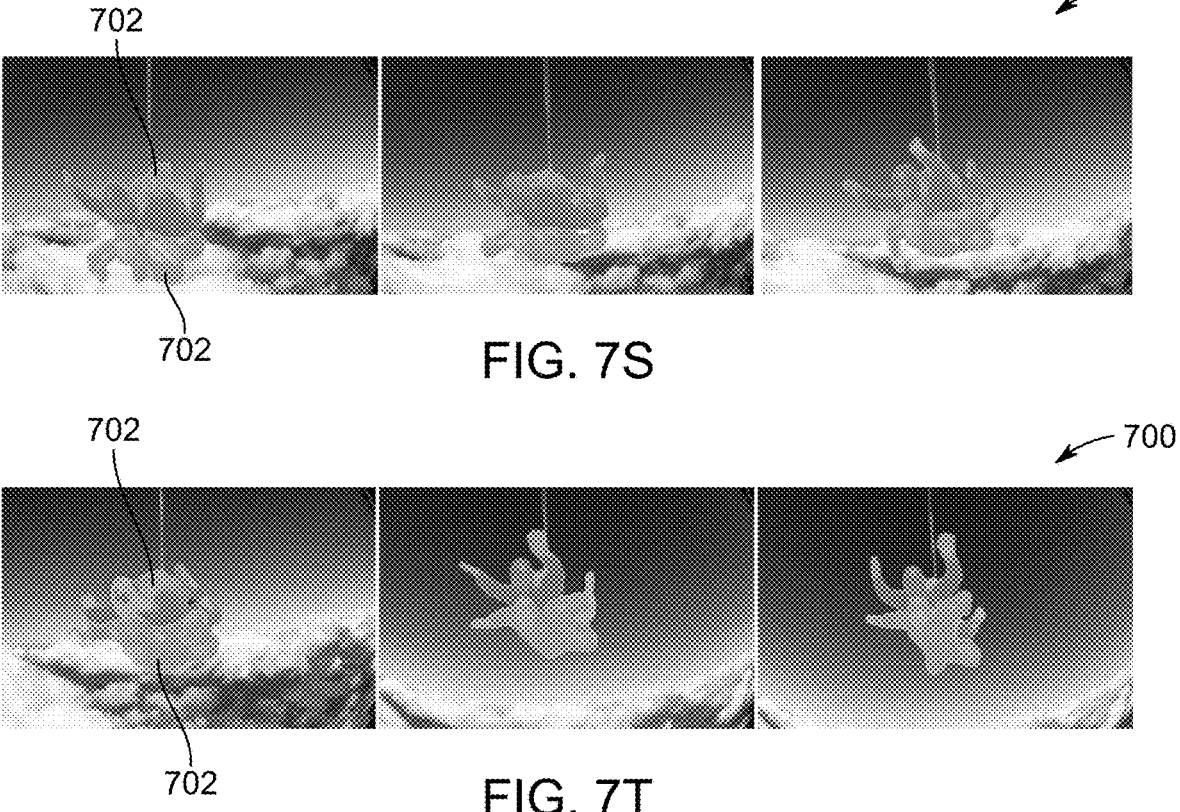
FIG. 7S
FIG. 7T

702

700

702

700

702

700

702

700

SYSTEM AND METHOD FOR VIDEO INSTANCE SEGMENTATION VIA RECURRENT ENCODER-BASED TRANSFORMERS

STATEMENT REGARDING PRIOR DISCLOSURE BY THE INVENTORS

Aspects of this technology are described in Thawakar, O., Rivkind, A., Ahissar, E., Khan, F. S. (2023). Fast Video Instance Segmentation via Recurrent Encoder-Based Transformers. In: Tsapatsoulis, N., et al. Computer Analysis of Images and Patterns. CAIP 2023. Lecture Notes in Computer Science, vol 14184. Springer, Cham. doi.org/10.1007/978-3-031-44237-7_25, and herein incorporated by reference in its entirety.

BACKGROUND

Field of the Invention

The present disclosure relates to a method and system for video instance segmentation, and in particular a deep learning network configured with a recurrent convolutional neural network trained through knowledge distillation by a transformer encoder.

Description of the Related Art

Video instance segmentation (VIS) is a challenging computer vision problem with numerous real-world applications ranging from intelligent video analytics to autonomous driving. Within the VIS problem, the task is to automatically segment and track all instances of objects belonging to a pre-defined set of categories. The problem is particularly challenging since the objects are desired to be accurately delineated at the pixel-level despite target appearance deformations in real-world scenarios.

Recently, transformers-based VIS approaches have shown significant improvement in performance on standard VIS benchmarks. See Miran Heo, Sukjun Hwang, Seoung Wug Oh, Joon-Young Lee, and Seon Joo Kim. 2022. VITA: Video Instance Segmentation via Object Token Association. In *Advances in Neural Information Processing Systems (NeurIPS)*: Omkar Thawakar, Sanath Narayan, Jiale Cao, Hisham Cholakkal, Rao Muhammad Anwer, Muhammad Haris Khan, Salman Khan, Michael Felsberg, and Fahad Shahbaz Khan. 2022. Video Instance Segmentation via Multi-scale Spatio-temporal Split Attention Transformer. *European Conference of Computer Vision (ECCV)* (2022): Yuqing Wang, Zhaoliang Xu, Xinlong Wang, Chunhua Shen, Baoshan Cheng, Hao Shen, and Huaxia Xia. 2021. End-to-End Video Instance Segmentation with Transformers. *CVPR* (2021): Junfeng Wu, Yi Jiang, Wenqing Zhang, Xiang Bai, and Song Bai. 2022. SeqFormer: a Frustratingly Simple Model for Video Instance Segmentation. *ECCV* (2022): JunfengWu, Qihao Liu, Yi Jiang, Song Bai, Alan Yuille, and Xiang Bai. 2022. In Defense of Online Models for Video Instance Segmentation. In *ECCV*; and Shusheng Yang, Xinggang Wang, Yu Li, Yuxin Fang, Jiemin Fang, Liu, Xun Zhao, and Ying Shan. 2022. Temporally Efficient Vision Transformer for Video Instance Segmentation. In *Proc. IEEE Conf. Computer Vision and Pattern Recognition (CVPR*. Most of these transformers-based VIS approaches are typically built on DETR or Deformable-DETR architecture, and utilizes an encoder-decoder design with an instance sequence matching and segmentation module to generate video instance mask predictions. See Nicolas Carion, Francisco Massa, Gabriel Synnaeve, Nicolas Usunier, Alexander Kirillov, and Sergey Zagoruyko. 2020. End-to-end object detection with transformers. In *ECCV*; and Xizhou Zhu, Weijie Su, Lewei Lu, Bin Li, Xiaogang Wang, and Jifeng Dai. 2021. Deformable DETR: Deformable Transformers for End-to-End Object Detection. *ICLR* (2021. Some of the existing transformers-based VIS approaches utilize single-scale spatio-temporal features during the attention computation and process a larger set of input frames (e.g. 36 frames). On the other hand, some of the other transformers-based VIS approaches employ per-frame multi-scale features during the attention computation with a smaller set of input frames to mitigate computational complexity and memory overhead. However, such an attention computation in the encoders is computationally expensive, thereby hampering the inference speed. Further, this computational overhead may also lead to over-fitting affecting the video mask instance prediction performance.

Several previous approaches have addressed the problem of VIS by adopting a single-stage detection pipeline, such as FCOS, in which linear combination of a segmentation masks are directly generated as final segmentation masks. See Ali Athar, S. Mahadevan, Aljosa Osep, L. Leal-Taixé, and B. Leibe. 2020. STEm-Seg: Spatio-temporal Embeddings for Instance Segmentation in Videos. In *ECCV*: Jiale Cao, Rao Muhammad Anwer, Hisham Cholakkal, Fahad Shahbaz Khan, Yanwei Pang, and Ling Shao. 2020. SipMask: Spatial Information Preservation for Fast Image and Video Instance Segmentation. In *ECCV*; Lei Ke, Xia Li, Martin Danelljan, Yu-Wing Tai, Chi-Keung Tang, and Fisher Yu. 2021. Prototypical Cross-Attention Networks for Multiple Object Tracking and Segmentation. In *NeurIPS*; Minghan Li, Shuai Li, Lida Li, and Lei Zhang. 2021. Spatial Feature Calibration and Temporal Fusion for Effective One-stage Video Instance Segmentation. In *CVPR*; Dongfang Liu, Yiming Cui, Wenbo Tan, and Yingjie Chen. 2021. Sg-net: Spatial granularity network for one-stage video instance segmentation. In *CVPR*; and Zhi Tian, Chunhua Shen, Hao Chen, and Tong He. 2019. FCOS: Fully Convolutional One-Stage Object Detection. In *ICCV*. SipMask introduces a spatial information preservation module based on the single-stage architecture within the YOLACT framework for generating video instance segmentation masks. See Daniel Bolya, Chong Zhou, Fanyi Xiao, and Yong Jae Lee. 2019. YOLACT: Real-Time Instance Segmentation. An approach where a video clip is taken as a spatio-temporal volume and processes them using short 3D convolutional spatio-temporal module to learn pixel-level embedding by posing segmentation as a bottom-up grouping can be used. By modifying a space-time memory into a set of prototypes at the instance and frame-levels, PCAN introduces an attention scheme. Other methods extend an image instance segmentation model to the VIS task by introducing additional tracking branch. See Gedas Bertasius and Lorenzo Torresani. 2020. Classifying, Segmenting, and Tracking Object Instances in Video with Mask Propagation. In *CVPR*: Yang Fu, Linjie Yang, Ding Liu, Thomas S Huang, and Humphrey Shi. 2021. CompFeat: Comprehensive Feature Aggregation for Video Instance Segmentation. *AAAI* (2021).

Several clip-level VIS methods take video clip as input and generate the sequential segmentation results. STEmSeg utilizes video-clip as spatio-temporal volume and separate the object instance by clustering. After the introduction of DETR and Deformable-DETR, transformers-based methods have gained popularity due to their promising video instance mask segmentation performance. See Bowen Cheng, Ishan Misra, Alexander G. Schwing, Alexander Kirillov, and Rohit Girdhar. 2022. Masked-attention Mask Transformer for Universal Image Segmentation. In *Proc. IEEE Conf. Computer Vision and Pattern Recognition (CVPR)*: Sukjun Hwang, Miran Heo, Seoung Wug Oh, and Seon Joo Kim. 2021. Video instance segmentation using inter-frame communication transformers. *NeurIPS* 34 (2021), 13352-13363; Rajat Koner, Tanveer Hannan, Suprosanna Shit, Sahand Sharifzadeh, Matthias Schubert, Thomas Seidl, and Volker Tresp. 2022. InstanceFormer: An Online Video Instance Segmentation Framework. *European Conference of Computer Vision (ECCV)*. VisTR was the first transformers-based VIS framework utilizing single-scale features. After the success of Deformable-DETR in generic object detection, Seq-Former which uses multi-scale features to generate the video instance mask predictions was introduced.

Knowledge distillation in vision tasks has gained popularity in recent years, with numerous works focusing on how to transfer knowledge from a large pre-trained model to a smaller student network. In this context, knowledge distillation refers to the process of training a smaller network to imitate the output of a larger network on a given computer vision task. Previous studies have shown that this can result in promising performance and faster inference times, when comparing with training a smaller network from the scratch. Hinton et al. propose the use of soft targets as a way to distill knowledge. See Geoffrey Hinton, Oriol Vinyals, and Jeff Dean. 2015. Distilling the knowledge in a neural network. *arXiv preprint arXiv:* 1503.02531. The concept of fitnets, a type of distillation that involves matching the intermediate representations of the teacher and student networks is known. See Adriana Romero, Nicolas Ballas, Samira Ebrahimi Kahou, Antoine Chassang, Carlo Gatta, and Yoshua Bengio. 2014. Fitnets: Hints for thin deep nets. *arXiv preprint arXiv:* 1412.6550. More recent works have also explored different types of distillation, such as attention-based distillation, adversarial distillation, transfers knowledge from a two-stage detector to a one-stage detector using knowledge distillation and distillation methods for semantic segmentation. See Sergey Zagoruyko and Nikos Komodakis. 2016. Paying more attention to attention: Improving the performance of convolutional neural networks via attention transfer. *arXiv preprint arXiv:* 1612.03928b: Nicolas Papernot, Patrick McDaniel, Xi Wu, Somesh Jha, and Ananthram Swami. 2016. Distillation as a defense to adversarial perturbations against deep neural networks. 2016 *IEEE symposium on security and privacy (SP)*, 582-597; Guobin Chen, Wongun Choi, Xiang Yu, Tony Han, and Manmohan Chandraker. 2017. Learning efficient object detection models with knowledge distillation. *Advances in neural information processing systems* 30 (2017): Zijian Kang, Peizhen Zhang, Xiangyu Zhang, Jian Sun, and Nanning Zheng. 2021. Instance-conditional knowledge distillation for object detection. *Advances in Neural Information Processing Systems* 34 (2021), 16468-16480; Linfeng Zhang and Kaisheng Ma. 2021. Improve object detection with feature-based knowledge distillation: Towards accurate and efficient detectors. *International Conference on Learning Representations*: Yifan Liu, Ke Chen, Chris Liu, Zengchang Qin, Zhenbo Luo, and Jingdong Wang. 2019. Structured knowledge distillation for semantic segmentation. *Proceedings of the IEEE CVF Conference on Computer Vision and Pattern Recognition,* 2604-2613; and Chuanguang Yang, Helong Zhou, Zhulin An, Xue Jiang, Yongjun Xu, and Qian Zhang. 2022. Cross-image relational knowledge distillation for semantic segmentation. *Proceedings of the IEEE CVF Conference on Computer Vision and Pattern Recognition,* 12319-12328.

Recently, the effective use of recurrent networks using knowledge distillation for real-time data gathered was demonstrated. See Alexander Rivkind, Or Ram, Eldad Assa, Michael Kreiserman, and Ehud Ahissar. 2021. Visual hyperacuity with moving sensor and recurrent neural computations. *International Conference on Learning Representations*. Knowledge distillation from a standard transformers encoder to a recurrent encoder in a transformers-based framework for the problem of VIS is unknown.

Accordingly, it is one object of the invention to provide a video instance segmentation (VIS) method that is efficient and effective in capturing of multi-scale spatio-temporal features in a video. A further object is a VIS method that can operate in real time while also improving mask quality. A further object is a VIS framework that effectively learns multiscale spatio-temporal features through knowledge distillation from an attention-based encoder.

SUMMARY

Aspects of the present disclosure include a computer vision system, that can include a video camera to capture a sequence of video frames: a machine learning processing engine for video instance segmentation; and a video output for outputting a sequence of mask instances, wherein the machine learning processing engine is configured with an interchangeable encoder module, wherein during inference, the encoder module is configured with a recurrent encoder having a combination of convolutional and recurrent layers, wherein the recurrent layers capture temporal relationships between the video frames, wherein during training, the encoder module is configured with a teacher transformer encoder for training the recurrent encoder as a student through knowledge distillation: a transformer decoder outputting video instance mask predictions; and a segmentation block receiving the output from the decoder and generates a final sequence of mask instances.

A further aspect is a computer vision method, that can include capturing, by a video camera, a sequence of video frames: segmenting video instances in the captured video frames, by machine learning; and outputting a sequence of mask instances, wherein the machine learning includes during inference, capturing temporal relationships, by a recurrent encoder, between the video frames, during training, training the recurrent encoder as a student through knowledge distillation using a teacher transformer encoder: outputting, from a transformer decoder, video instance mask predictions: receiving, by a segmentation block, an output from the transformer decoder; and generating a final sequence of mask instances.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE INVENTION

Figure 1:
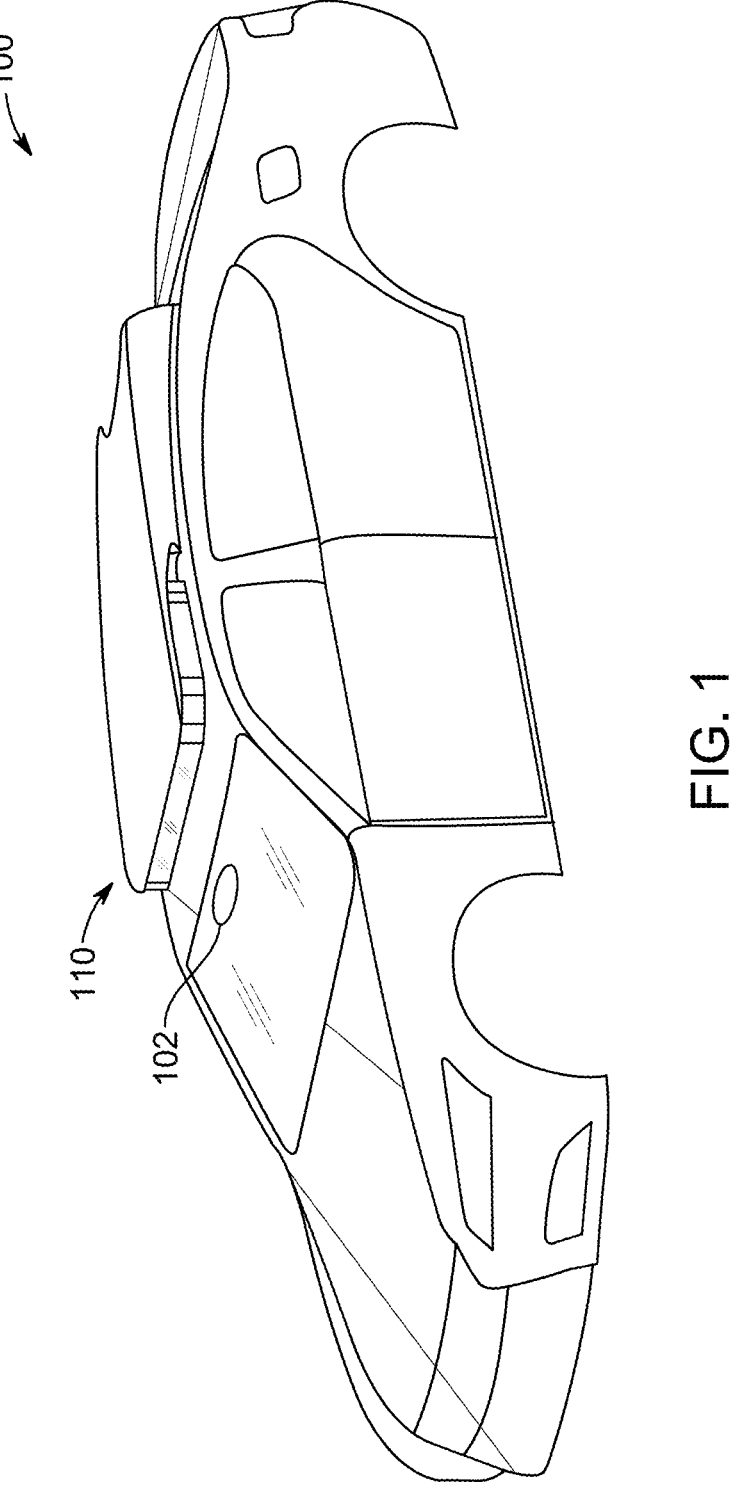
FIG. 1 is a schematic diagram of a vehicle equipped with driver assist features.

In the drawings, like reference numerals designate identical or corresponding parts throughout the several views. Further, as used herein, the words "a," "an" and the like generally carry a meaning of "one or more," unless stated otherwise.

Aspects of this disclosure are directed to a system, device, and method for a light-weight recurrent-CNN encoder that gathers relevant instance features along spatial and temporal axes, while aiming to preserve discriminative information. The light-weight recurrent-based encoder learns the multi-scale spatio-temporal features from the standard attention-based encoder through knowledge distillation. The entire VIS framework is trained in an end-to-end fashion, thereby efficiently learning multi-scale spatio-temporal features from the teacher (attention-based encoder) to the student (light-weight recurrent-encoder). The VIS framework based on the light-weight recurrent encoder operates at a fast inference speed, while achieving high quality video mask instance predictions.

More and more vehicles are being equipped with advanced driver assistance safety systems (ADAS). These systems are designed to keep the driver and passengers safe on the road.

FIG. 1 is a schematic diagram of a vehicle equipped with driver assist features. A vehicle 100 equipped for ADAS may include combinations of various sensors. In some cases external environment sensors are provided as a roof mounted sensor array 110. One equipment that may be part of ADAS is a forward-facing camera 102.

The forward-facing camera 102 may be located at the top of the middle of the vehicle windshield. It is either mounted on or near the rearview mirror, and in some cases is built right into the rearview mirror. While most ADASs only use one camera, some ADAS may utilize two forward-facing cameras.

The forward-facing camera 102 may primarily be part of a system to control the distance of the vehicle from objects ahead. However, it may serve other roles. For example, the front-facing camera 102 may serve a role to provide input to lane departure warning and lane keep systems. These systems are typically found together, as one is often the precursor to the other. This means that the systems will produce one or more warnings of an eminent unintended lane departure before intervening and correcting the vehicle to the center of the lane. The camera obtains a video and identifies lane markings. The systems then determine if the vehicle is adequately within those markings.

An ADAS may include a traffic sign recognition system. The traffic sign recognition system can use the forward-facing camera. With this system the camera can recognize common road signs such as stop, speed limit and do not enter signs. The system may display the recognized sign on the vehicle instrument cluster. In some cases, the system will provide a haptic (vibrating) or audible warning depending upon the sign.

ADAS are for providing driver assistance with a driver performing the driving. Various levels of vehicle automation are being developed.

Figure 2:
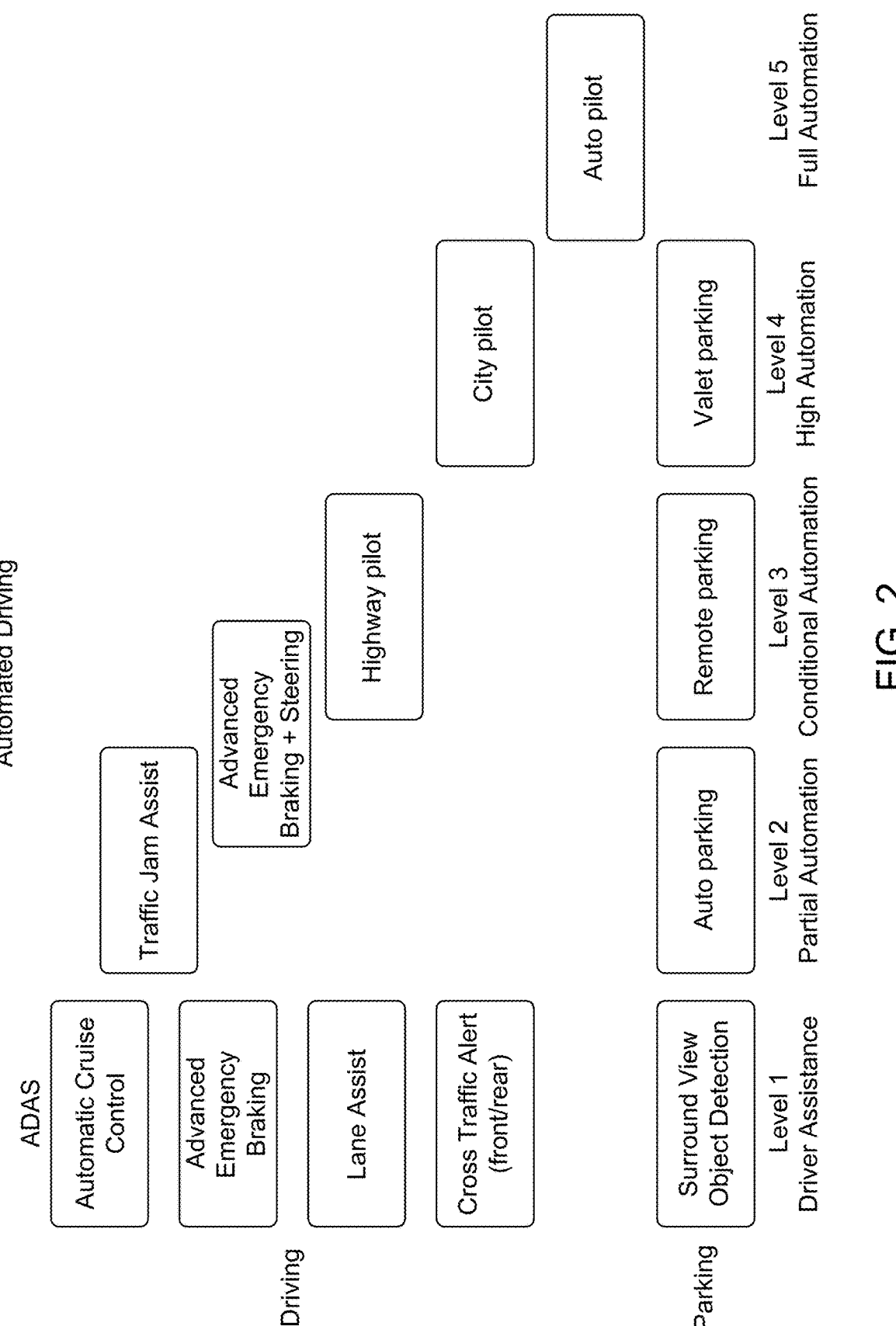
FIG. 2 illustrates levels of automation in vehicles.

FIG. 2 is a diagram of levels of automation that have been defined for vehicles. Level 0 is momentary drive assistance, where a driver is fully responsible for driving the vehicle while a control system provides momentary driving assistance, like warnings and alerts, or emergency safety interventions. Level 1 is driver assistance, where the driver is fully responsible for driving the vehicle while a control system provides continuous assistance with either acceleration/braking or steering. Level 1 can include automatic cruise control, advanced emergency braking, lane assist, and cross traffic alert (front/read), as well as surround view object detection. Level 2 is additional driver assistance (partial automation), where the driver is fully responsible for driving the vehicle while a control system provides continuous assistance with both acceleration/braking and steering. Level 2 can include automatic parking. Level 3 is conditional automation, where the control system handles all aspects of driving while a driver remains available to take over driving if the control system can no longer operate. Level 4 is high automation, where when engaged, the control system is fully responsible for driving tasks within limited service areas. A human driver is not needed to operate the vehicle. Level 5 is full automation (auto pilot), where when engaged, the control system is fully responsible for driving tasks under all conditions and on all roadways. A human driver is not needed to operate the vehicle.

Figure 3:
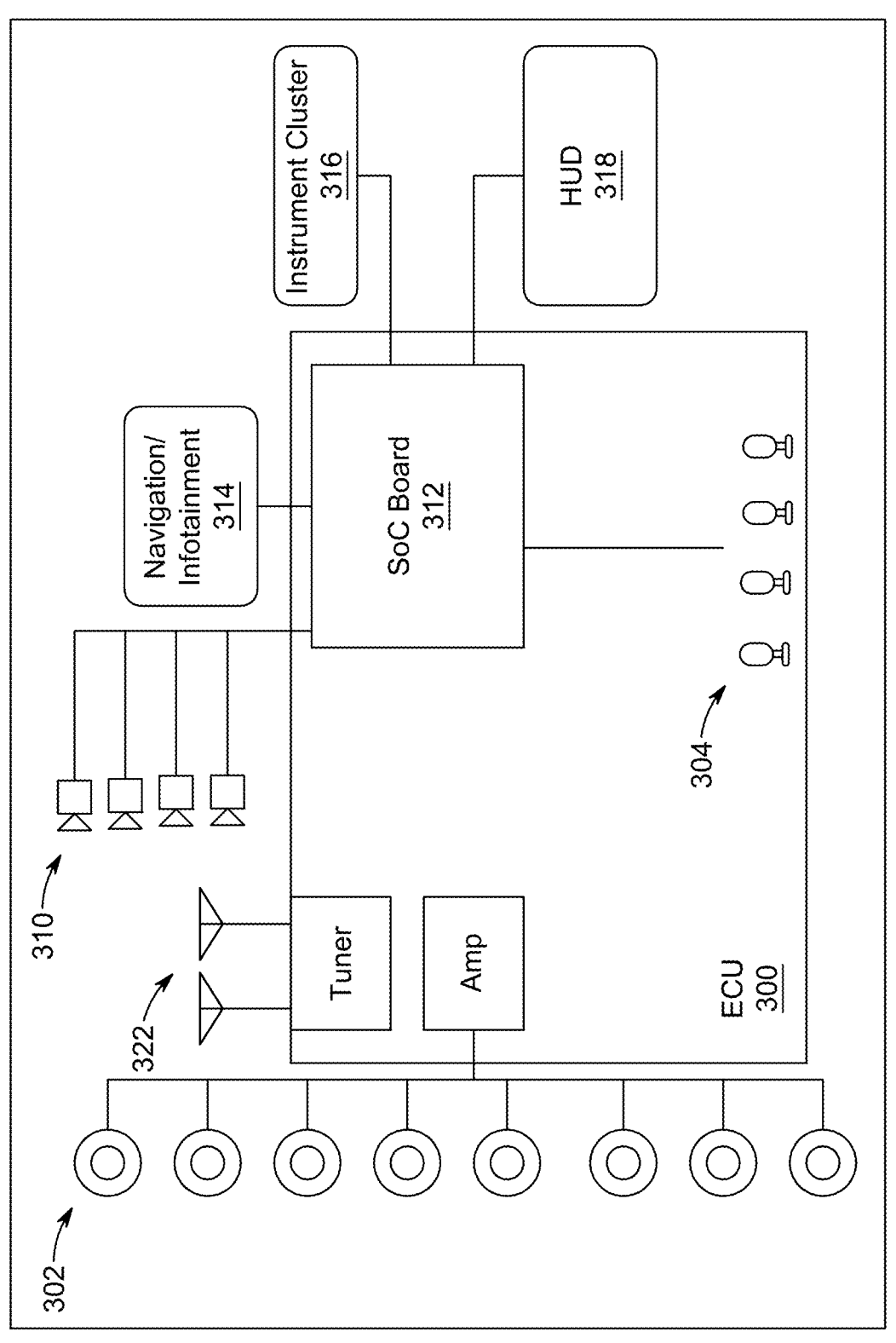
FIG. 3 is non-limiting exemplary driver assist system of a vehicle.

FIG. 3 is a block diagram of a vehicle control system for a multi-sensor equipped vehicle. The control system 300 may be used for any of levels 0 to 5. The control system 300 includes sensors such as a number of radar sensors 312, antennas 314, video cameras 324, microphones 322. An electronic control unit (ECU) 302 can include a tuner 316 and Amp 318, and a system on chip (SoC) 320. The SoC 320 can be connected to an infotainment cluster 326, instrument cluster 328, and head up display (HUD) 330.

In disclosed embodiments, the vehicle control system is configured with a machine vision system. A machine vision system can accommodate various types of vision tasks, including image recognition, object detection, and instance segmentation. Instance segmentation is a computer vision task that involves identifying and separating individual objects within an image, including detecting the boundaries of each object and assigning a unique label to each object. Video instance segmentation is used for simultaneous detection, segmentation and tracking of instances in videos.

Detection, segmentation and tracking of instances in videos is an important feature for autonomous driving. More importantly, to be effective, operation of detection, segmentation and tracking must be performed in real time while a vehicle is being driven.

A Recurrent SeqFormer method is disclosed for video instance segmentation that achieves significantly faster speeds over conventional methods for video instance segmentation. Moreover, the Recurrent SeqFormer method efficiently captures multi-scale spatio-temporal features and provides improved video instance mask quality.

Figures 4A, 4B:
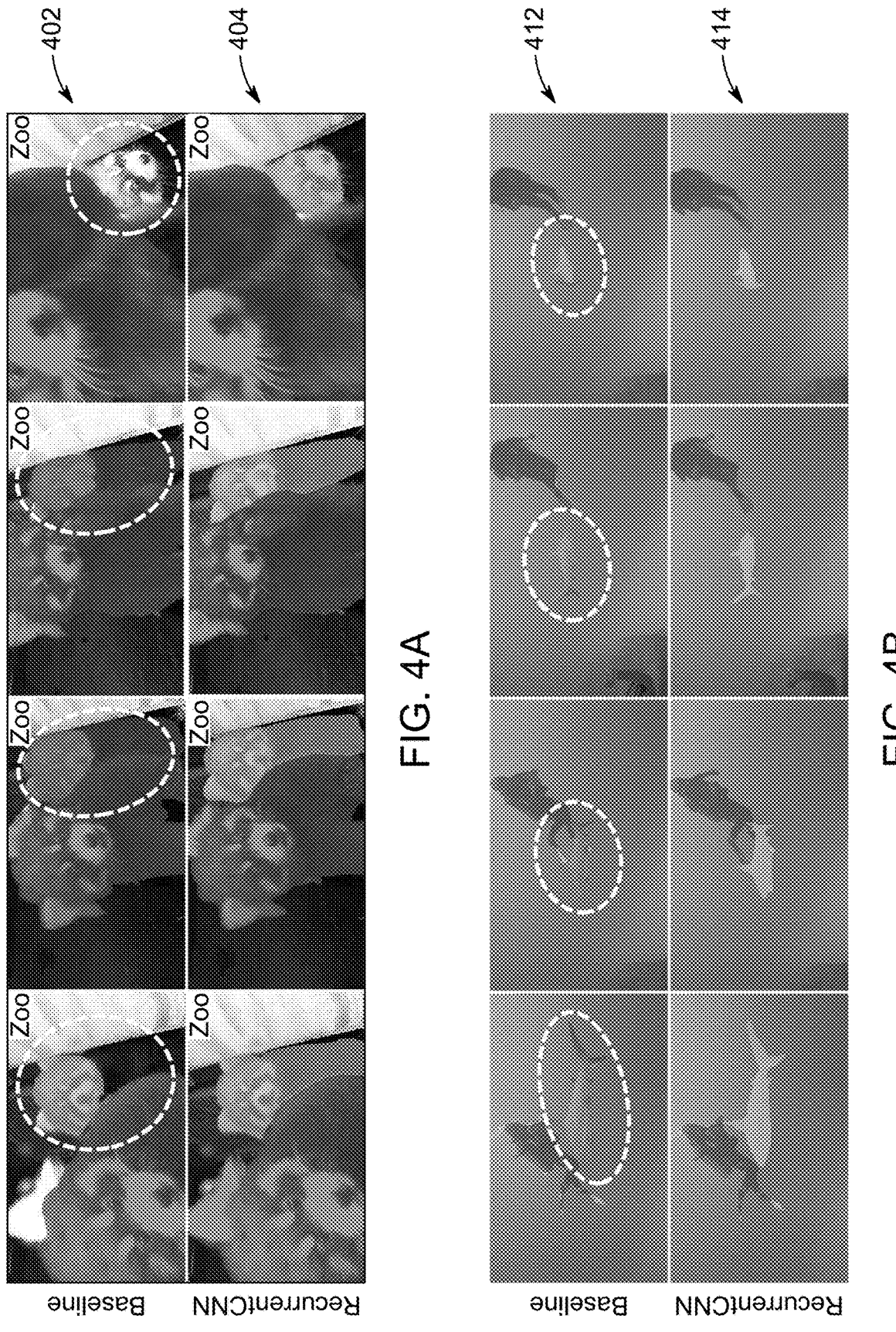
FIGS. 4A, 4B illustrates a qualitative comparison between baseline SeqFormer (top row) and Recurrent SeqFormer (bottom row) on example video frames from the Youtube-VIS 2019 benchmark validation set.

The Recurrent SeqFormer method is implemented in a fast VIS framework. The VIS framework includes a light-weight recurrent-CNN encoder that effectively learns multiscale spatio-temporal features through knowledge distillation from an attention-based transformer encoder. The recurrent-CNN encoder is generalizable as demonstrated by integrating it into two conventional transformers-based VIS frameworks. The recurrent-CNN encoder was tested by conducting extensive experiments on the popular Youtube-VIS 2019 benchmark. Results reveal the merits of the recurrent-CNN encoder with consistent improvement in the inference speed over baseline VIS frameworks. For example, compared to the baseline SeqFormer (introduced in Wu et al. in *ECCV* (2022)), the Recurrent SeqFormer, achieves 2× speedup while also improving the mask quality. FIGS. 4A, 4B illustrates a qualitative comparison between baseline SeqFormer (row 402, row 412) and Recurrent SeqFormer (row 404, row 414) on example video frames from the Youtube-VIS 2019 benchmark validation set. Here, the baseline struggles to capture the object instance undergoing deformations such as the fox in the video in row 402 of FIG. 4A and the shark in row 412 in the video of FIG. 4B (encircled in white dotted lines).

1. Baseline VIS Framework

The recently introduced SeqFormer that utilizes Deformable-DETR as an underlying architecture employing multi-scale features is exploited in the present disclosure. SeqFormer utilizes a CNN backbone, and comprises multi-scale deformable attention based encoder-decoder and mask head for video mask prediction. See Kaiming He, Xiangyu Zhang, Shaoqing Ren, and Jian Sun. 2016. Deep Residual Learning for Image Recognition. In *CVPR*, incorporated herein by reference in its entirety. Here, a video clip with T frames of size $H^o \times W^o$ is input to the feature extractor backbone. Multi-scale features are extracted from the $conv_3$, $conv_4$, $conv_5$ layers of the backbone. An additional feature is constructed by down-sampling $conv_5$ feature. These features are then passed through separate convolution layers in order to make the same output feature dimension C. The resulting multi-scale features are processed by transformer encoder containing multi-scale deformable attention blocks. Further, transformer decoder has series of self-attention and deformable cross-attention of these multi-scale features with instance queries to generate the per-frame instance-level features. These instance level-features are then utilized by mask head to obtain final instance segmentation masks of the video.

As discussed earlier, the Seqformer is built on Deformable-DETR utilizing deformable attention mechanism in an encoder to compute intra-frame multi-scale features. This deformable attention mechanism is computationally expensive when computing multi-scale features in a video and becomes further challenging in the case of constructing joint spatio-temporal deformable attention. In disclosed embodiments, a solution is an approach based on a recurrent encoder to efficiently exploit spatio-temporal context across frames.

2. Overall Architecture

Figure 5:
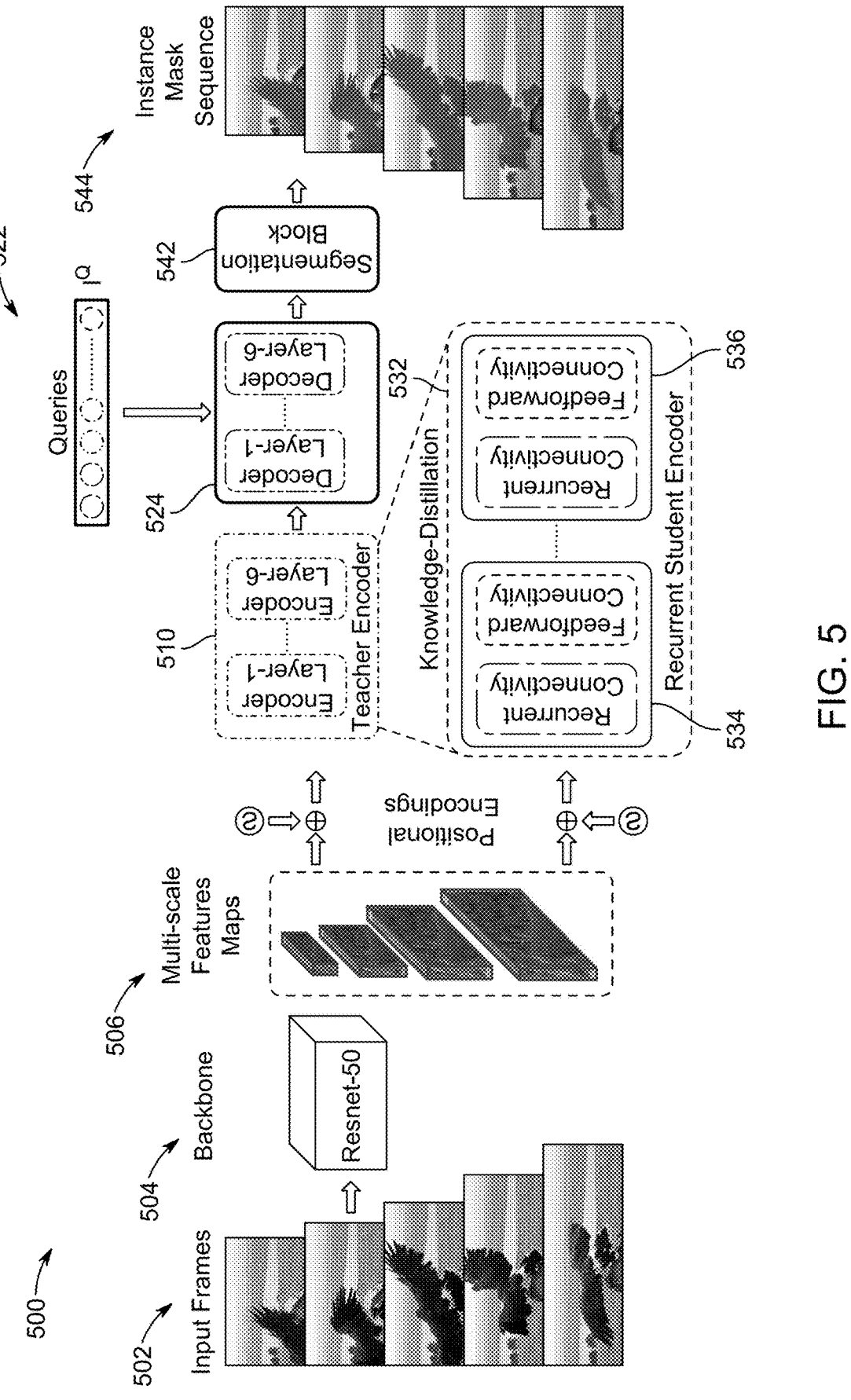
FIG. 5 is a block diagram of an architecture of Recurrent SeqFormer.

FIG. 5 is a block diagram of an overall architecture of Recurrent SeqFormer. As illustrated in FIG. 5, the Recurrent SeqFormer consists of a feature extractor backbone 504 (e.g., ResNet-50), a transformer encoder 510, transformer decoder 524, segmentation head 542, and a student recurrent-CNN encoder 532 to learn the feature representation from the transformer encoder 510. The backbone 504 extracts features from the input video 502, the transformer encoder-decoder 510, 524 learns the similarity of pixel-level and instance-level features, whereas the segmentation head 542 generates the final instance-level segmentation mask 544. The focus of the VIS system is the introduction of the recurrent encoder 532 that is trained using the supervision from a transformers encoder 510 with the motivation of mimicking the original feature representation of the transformers encoder 510. Through this knowledge-distillation scheme, the light-weight student recurrent encoder is used instead of the less efficient attention-based encoder, thereby increasing the inference speed while also achieving promising segmentation performance. Next, the recurrent encoder is described in detail.

3. Light-Weight Recurrent Encoder for Distilling Knowledge from Standard Attention Encoder The recurrent-CNN encoder 532, as shown in FIG. 5, comprises recurrent connectivity 534 followed by feed-forward connectivity 536. The recurrent encoder 532 uses a combination of convolutional and recurrent layers to extract features from video frames. The convolutional layers are responsible for extracting visual features from the video frames, whereas the recurrent layers capture the temporal relationships between frames. This allows the recurrent encoder 532 network to learn the long-term temporal dynamics in the video and make better predictions about the instances in the video. Here, the recurrent encoder 532 is designed to be computationally efficient compared to joint spatio-temporal attention and deformable multi-scale attention, to handle long sequences effectively.

The recurrent encoder 532 comprises six recurrent student encoder blocks. Each recurrent student encoder block consists of two modules: (a) recurrent connectivity 534 and (b) feedforward connectivity 536. The recurrent connectivity module 534 includes a convolution layer with a kernel size of 3×3 and 256 output channels, followed by a recurrent long short-term memory (LSTM) layer to encode the temporal information within the frames. The hidden dimension size for both modules is set to 256. Next, the knowledge distillation scheme is described.

Knowledge Distillation from Teacher Encoder. To train the recurrent-CNN encoder 532, knowledge-distillation is from a transformer encoder 510 to the recurrent-CNN encoder 532. As recurrent-CNNs are generally difficult to train and prone to overfit, the employed training aids the student (recurrent) encoder to learn more effectively, as it is able to benefit from the knowledge acquired by the teacher (attention) encoder 510. To make the student encoder learn to mimic the feature representation of original teacher transformer encoder 510, the teacher-student training is introduced after several epochs during the training procedure. It can be empirically observed (see Table 1) that improved performance is achieved from the student encoder 532 compared to training from scratch. The aforementioned training procedure is then adopted during the VIS framework training.

9

TABLE 1

Ablation study when integrating their recurrent encoder in place of standard transformers encoder into the baselines. Compared to the baseline VisTR (row 1), the final approach (row 4), achieves superior video mask prediction performance in terms of overall average precision (AP), while also improving the inference speed. Similarly, when comparing with the baseline SeqFormer (row 5), the final approach (row 8) improves the overall AP from 45.1 to 45.6, while also achieving a two-fold speedup in terms of inference speed.

| Model | Knowledge-Distillation | Stage-1 | Stage-2 | AP | FPS |
|---|---|---|---|---|---|
| VisTR [26] | x | ✓ | ✓ | 36.2 | 30 |
| Recurrent VisTR | x | ✓ | ✓ | 33.2 | 46 |
| Recurrent VisTR | ✓ | x | ✓ | 36.5 | 46 |
| Recurrent VisTR (Final) | ✓ | ✓ | ✓ | 37.0 | 46 |
| SeqFormer [27] | x | ✓ | ✓ | 45.1 | 10 |
| Recurrent SeqFormer | x | ✓ | ✓ | 42.8 | 20 |
| Recurrent SeqFormer | ✓ | ✓ | x | 45.3 | 20 |
| Recurrent SeqFormer (Final) | ✓ | ✓ | ✓ | 45.8 | 20 |

Figure 6:
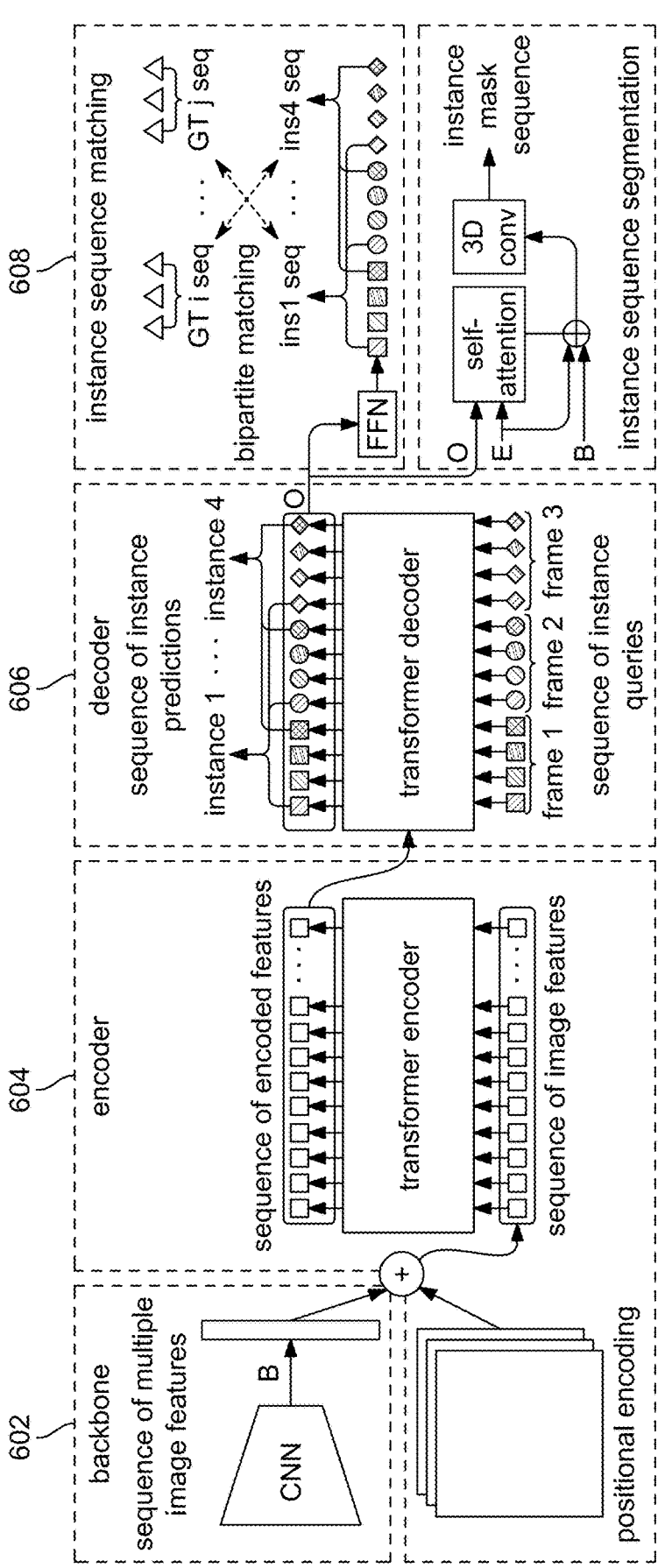
FIG. 6 is a block diagram of an architecture of VisTR.

Generalizibility of the Light-weight Recurrent Encoder. The recurrent student encoder 532, presented above, can be incorporated into different transformers-based VIS frameworks. To this end, the recurrent student encoder 532 is integrated into the VisTR framework. FIG. 6 is a block diagram of an architecture of VisTR. VisTR comprises a feature extractor backbone 602, a transformer encoder 604 with single-scale joint spatio-temporal attention, a transformer decoder 606, and an instance matching and segmentation block 608. The recurrent student encoder 532 is introduced into the VisTR pipeline and is employed in knowledge distillation to enforce the student encoder to mimic the feature representation learned by the transformer encoder. The transformer encoder 510 is replaced with the light-weight recurrent student encoder 532 at inference to achieve faster speed.

EXAMPLES

1. Dataset and Evaluation Metrics

The VIS method is evaluated on the popular YouTube-VIS 2019 dataset. See Linjie Yang, Yuchen Fan, and Ning Xu. 2019. Video instance segmentation. In *ICCV*, incorporated herein by reference in its entirety. The YouTube-VIS 2019 dataset is the first dataset for video instance segmentation, consisting of 2238 training clips, 302 validation clips, and 343 test clips that are high-resolution videos from YouTube. The dataset includes 40 different categories and 131,000 high-quality instance masks. In each video, objects are labeled every five frames with bounding boxes and masks.

The evaluation of video instance segmentation (VIS) involves measuring the average precision (AP) and average recall (AR). Unlike image instance segmentation, in which each instance is represented by a single mask, video instances are made up of a series of masks. To assess the consistency of the predicted mask sequences in both space and time, the intersection over union (IoU) calculation is performed in the spatial-temporal domain. This demands that the model not only achieve precise segmentation and classification results at the pixel-level in each frame, but also accurately track the instance masks across frames.

2. Experimental Setup

Implementation Details: Resnet-50 is used as the feature extractor backbone for video instance segmentation. When using VisTR as a baseline: Following the single-scale settings, $conv_5$ feature output from backbone feature extractor is used. The number of encoder and decoder layers were set to 6 with hidden dimensions 384. The default video clip length is T=36 and same hyper-parameters of DETR is used. When using SeqFormer as a baseline: The multi-scale features are extracted from the $conv_3$, $conv_4$ and $conv_5$ stages. Final features are obtained by using stride 2 convolution on $conv_5$ stage output. The resulting multi-scale features are mapped to the same feature dimension of 256 through convolution. Number of encoder and decoder layers were set to 6 with hidden dimensions 256. The default video clip length T=5.

Training: The same settings as that of utilized in the respective baselines are followed. MS COCO dataset is used for stage-1 pre-training of the model and the VIS benchmark YoutubeVIS-2019 for stage-2 training as done in the recent state-of-the-art methods. See Tsung-Yi Lin, Michael Maire, Serge J. Belongie, James Hays, Pietro Perona, Deva Ramanan, Piotr Dollár, and C. Lawrence Zitnick. 2014. Microsoft COCO: Common Objects in Context, incorporated herein by reference.

1. VisTR Baseline: For stage-1, the model is trained on MS COCO for 300 epochs. The student encoder is initially frozen until 50 epochs. After 50 epochs, the student encoder 532 is trained with input and output as that of original transformer encoder 510. Similarly for stage-2, the model has been trained for 18 epochs out of which student encoder started learning from 6'th epoch onwards.

2. SeqFormer Baseline: For stage-1 training, the method is trained for 50 epochs on MS COCO in which until 15 epochs the student encoder is kept frozen. For stage-2, the training has been performed on Youtube-VIS for 12 epochs, where student encoder starts training from epochs 5 onwards. Other training settings and hyper-parameters similar to the respective baselines were kept.

Inference: In the disclosed approach, the final inference is performed by replacing transformer encoder 510 with the light-weight student encoder 532. The output is generated using student encoder features in further stages of the original model. The entire input video after down sampling to 360p is provided to the model and instance-level segmentation masks are generated. The results are obtained through online server evaluation on the val. set.

3. Quantitative Comparison

Baseline Comparison. Here, the effectiveness of the student recurrent encoder is evaluated in Table 1 by progressively integrating it into the different stages of VIS training. Stage-1 is pretraining stage in VIS using MS COCO dataset, whereas stage-2 is video instance segmentation training using Youtube-VIS 2019 train data. All the models are evaluated on Youtube-VIS 2019 val. set by submitting the results to the online server. The results when using VisTR as the baseline are first discussed. When replacing the standard transformers encoder in VisTR with the recurrent encoder without any knowledge distillation (row 2), the resulting model to obtain inferior results over the baseline (row 1) can be observed. This is likely to be due to over-fitting since the recurrent encoder is trained from scratch. When replacing the conventional transformer encoder with the recurrent encoder by utilizing the knowledge distillation during only stage-2 training (row 3), it can be observed that a marginal improvement in overall segmentation performance. The final approach (row 4) that replaces standard transformers encoder with the recurrent encoder through knowledge distillation during training at both stages (similar to the baseline) achieves an overall improvement in video instance segmentation performance from 36.2% to 37.0%, while also operating at a faster inference speed.

When using the recent SeqFormer as the base framework (row 5), it can be observed that a similar trend with inferior performance when using recurrent encoder without knowledge distillation (row 6). The final Recurrent SeqFormer (row 8) improves the overall video instance segmentation performance from 45.1 to 45.8, while also improving the inference speed from 10 frames-per-second (FPS) to 20 FPS. Here, for a fair comparison all speed are measured on the machine with a NVIDIA RTX A-6000 GPU.

State-of-the-art Comparison. Here, the Recurrent Seq-Former is compared with state-of-the-art approaches in literature on Youtube-VIS 2019 val. set. Table. 2 presents the comparison. Among existing two-stage methods, MaskTrack R-CNN achieves overall video instance segmentation performance (AP) of 30.3%. Among single-stage methods, SipMask obtains overall AP score of 33.7%. The PCAN approach that is built on top of SipMask obtains improved video instance segmentation performance with overall AP score of 36.1%. When comparing with recent transformers-based VIS approaches, the IFC achieves overall AP of 41.2%. SeqFormer obtains overall AP score of 45.1%. The Recurrent SeqFormer improves the overall AP score from 45.1% to 45.8% with a reduction in parameters (params) along with a two-fold speedup in inference speed, compared to SeqFormer.

TABLE 2

Comparison with existing methods in literature on the Youtube-VIS 2019 validation set the Recurrent SeqFormer achieves overall video instance segmentation performance (AP) score of 45.8, thereby performing favorably compared to existing methods.

| Model | Venue | Params | AP | AP-50 | AP-75 |
|---|---|---|---|---|---|
| MaskTrack R-CNN | ICCV-19 | 58.1M | 30.3 | 51.1 | 32.6 |
| STEm-Seg | ECCV-20 | 50.5M | 30.6 | 50.7 | 33.5 |
| SipMask | ECCV-20 | 33.2M | 33.7 | 54.1 | 35.8 |
| CompFeat | AAAI-21 | — | 35.3 | 56 | 38.6 |
| SG-Net | CVPR-21 | — | 34.8 | 56.1 | 36.8 |
| PCAN | NeurIPS-21 | — | 36.1 | 54.9 | 39.4 |
| CrossVIS | ICCV-21 | 37.5M | 36.3 | 56.8 | 38.9 |
| VisTR | CVPR-21 | 58.3M | 36.2 | 59.8 | 36.9 |
| IFC | NeurIPS-21 | 39.3M | 41.2 | 65.1 | 44.6 |
| SeqFormer | ECCV-22 | 49.3M | 45.1 | 66.9 | 50.5 |
| Recurrent Seqformer | — | 44.8M | 45.8 | 68.5 | 49.5 |

See Kaiming He, Georgia Gkioxari, Piotr Dollar, and Ross B. Girshick. 2017. Mask R-CNN. In *ICCV*; Athar et al.; Cao et al.; Fu et al.; Dongfang Liu et al.; Ke et al.; Shusheng Yang, Yuxin Fang, Xinggang Wang, Yu Li, Chen Fang, Ying Shan, Bin Feng, and Wenyu Liu. 2021. Crossover learning for fast online video instance segmentation. In *ICCV*; Wang et al.; Hwang et al.; and Wu et al., *ECCV* (2022), each incorporated herein by reference in their entirety.

Qualitative Analysis

Figure 7:
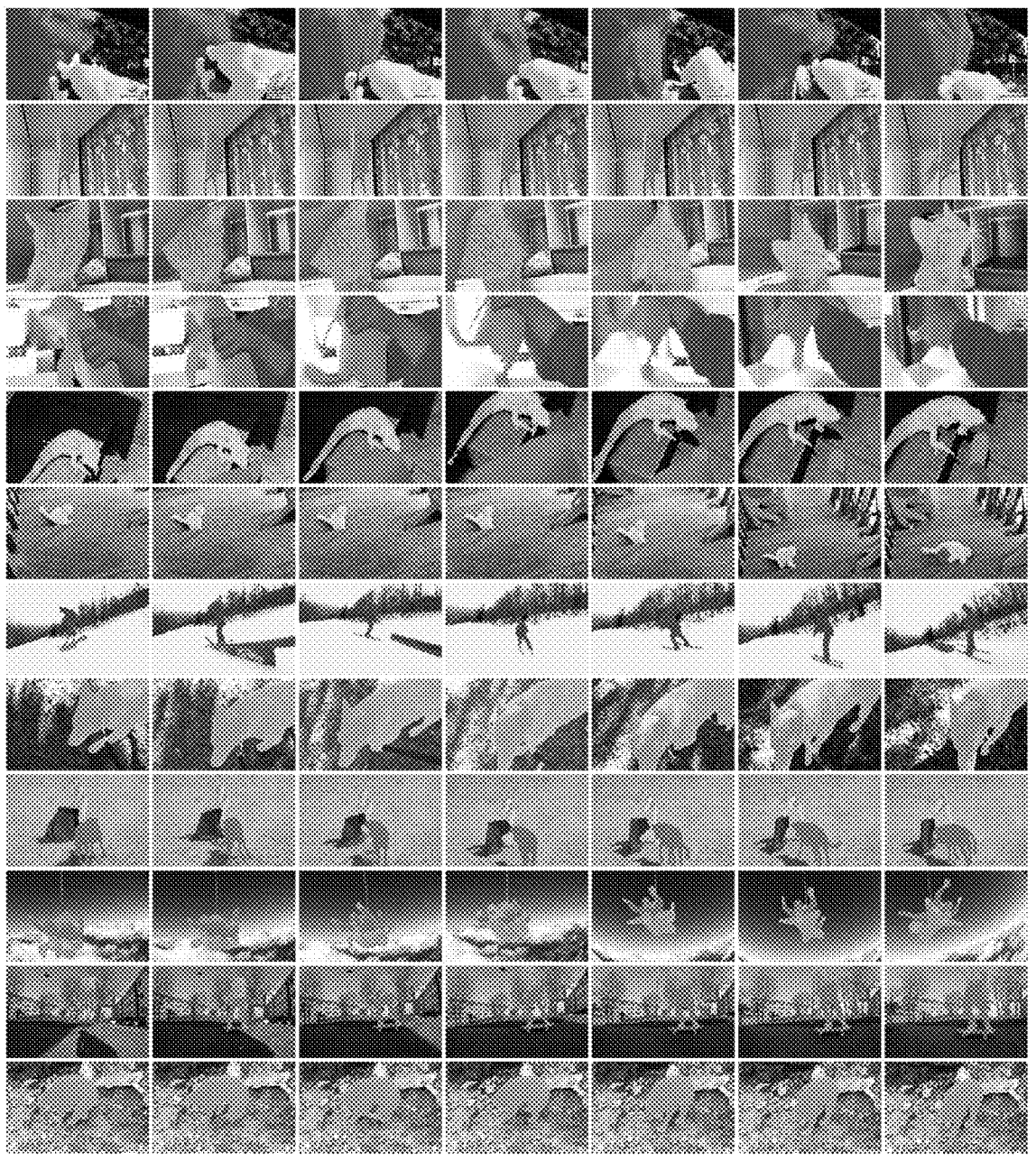
FIGS. 7, 7A-7X illustrates qualitative results of the Recurrent SeqFormer on example video frames from the Youtube-VIS 2019 validation set and the original transformers encoder.
Figures 7A, 7B, 7C, 7D:
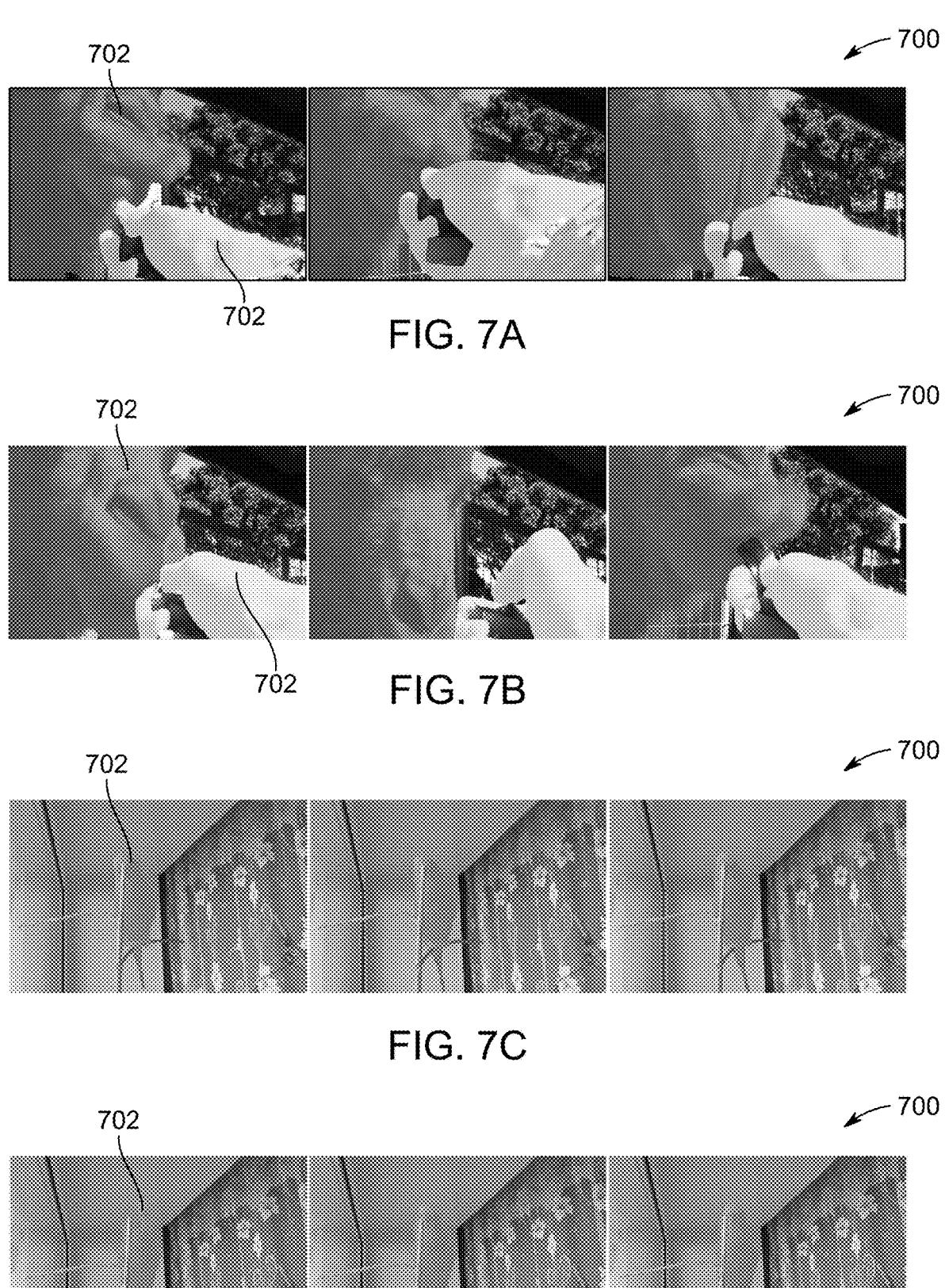
Figure 7E:
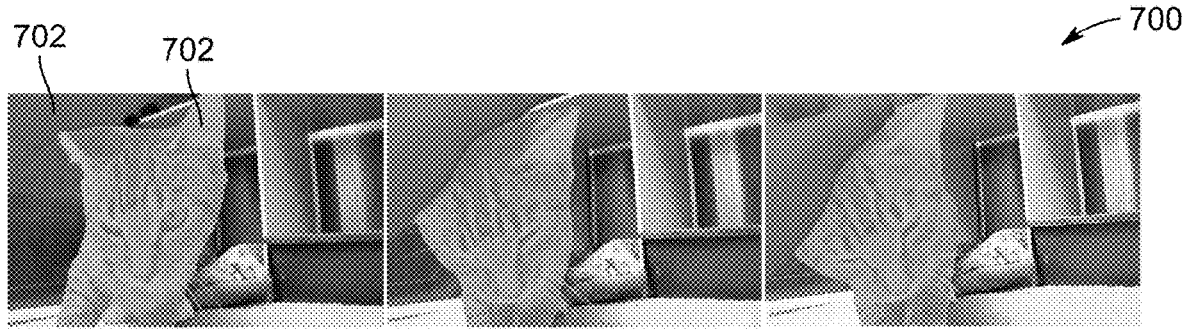
Figure 7F:
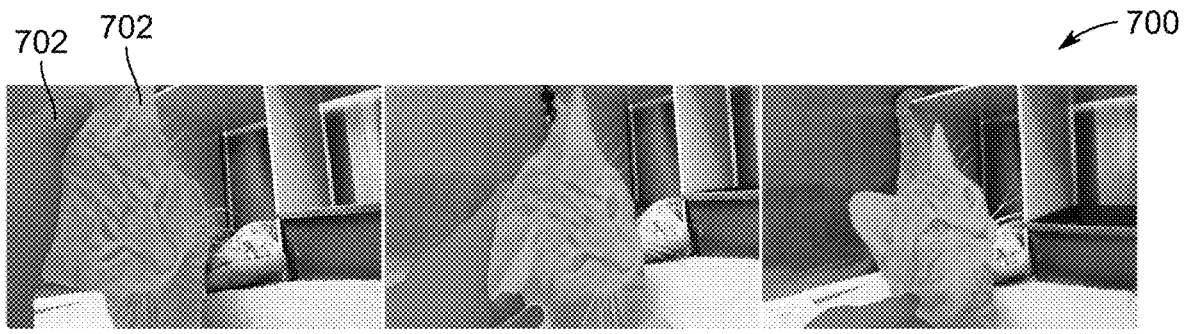
Figure 7G:
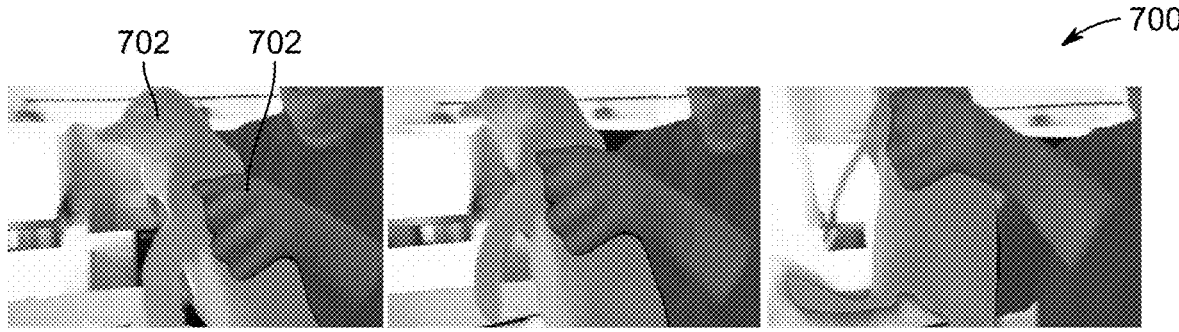
Figure 7H:
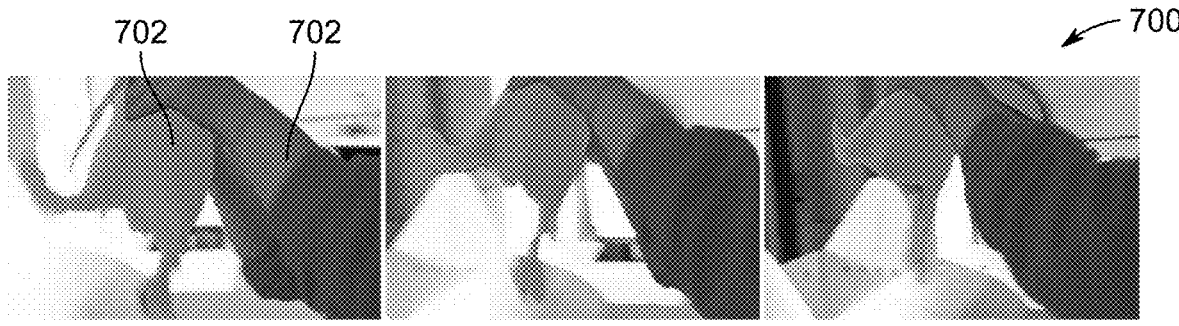
Figure 7I:
Figure 7J:
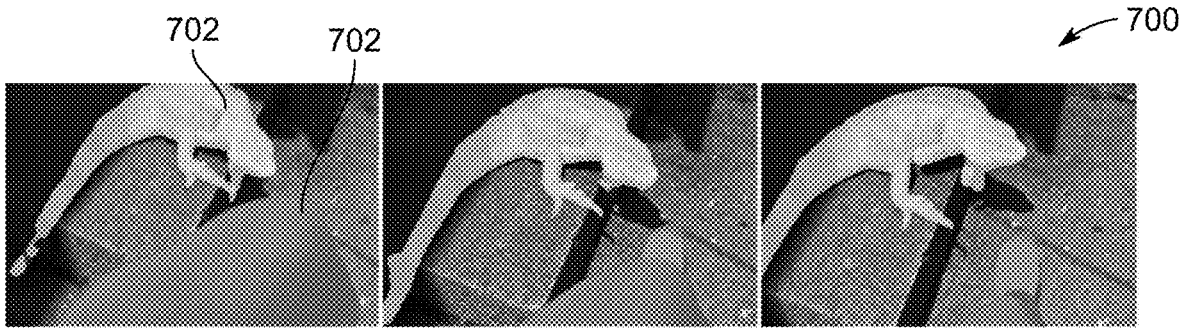
Figure 7K:
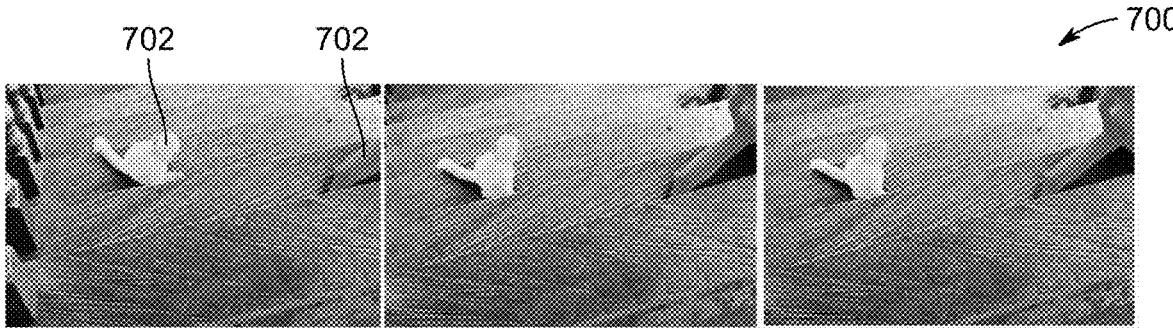
Figure 7L:
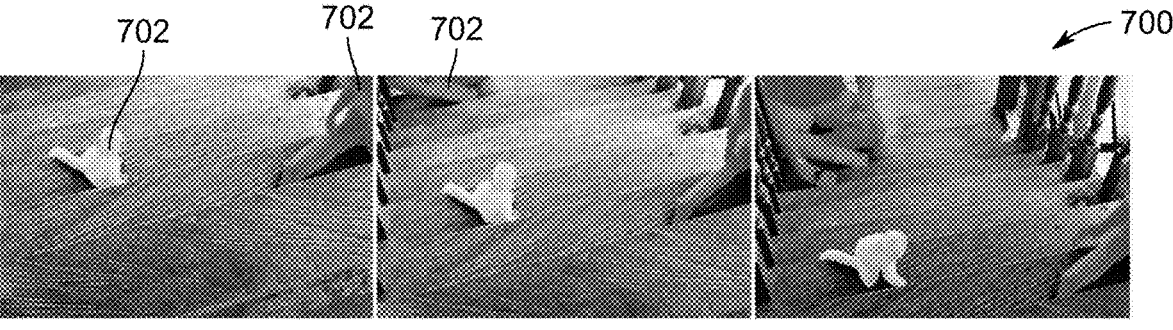
Figure 7M:
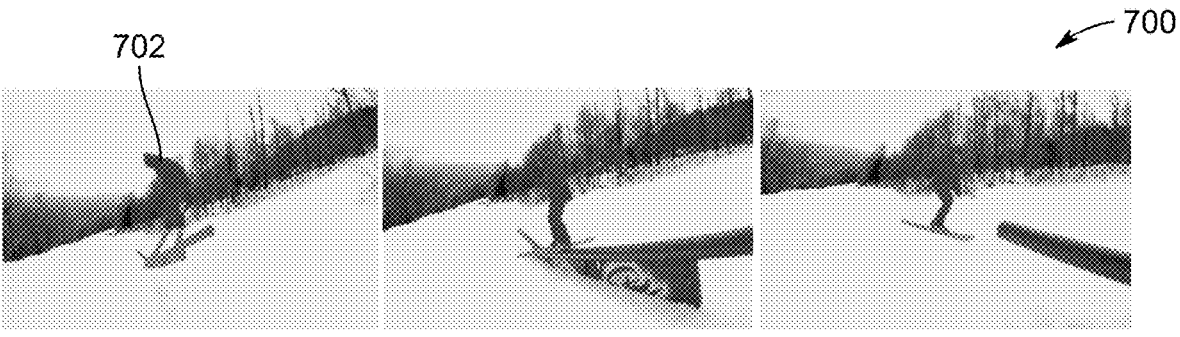
Figure 7N:
Figure 7O:
Figure 7P:
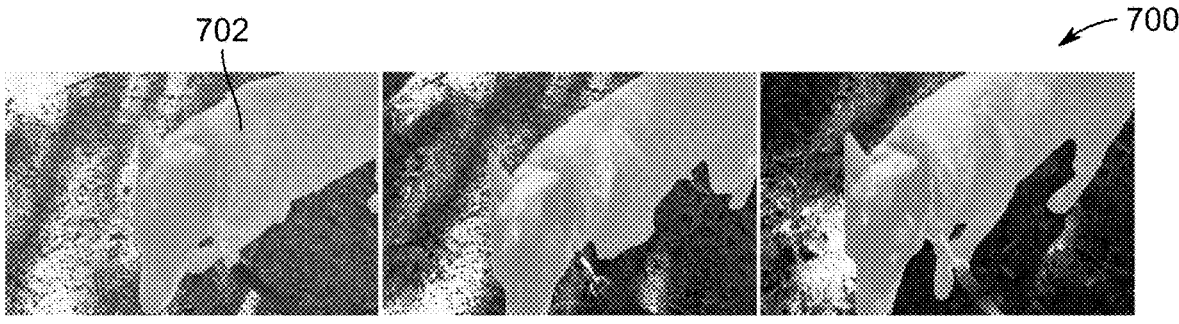
Figure 7U:
Figure 7V:
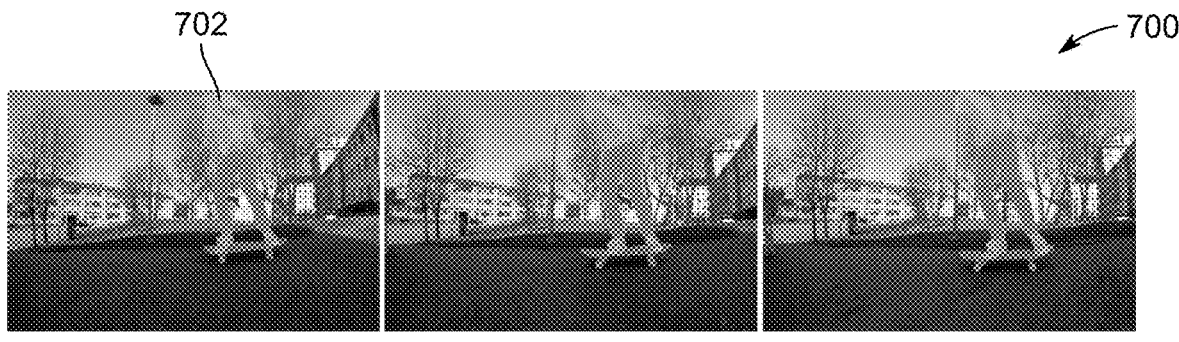
Figure 7W:
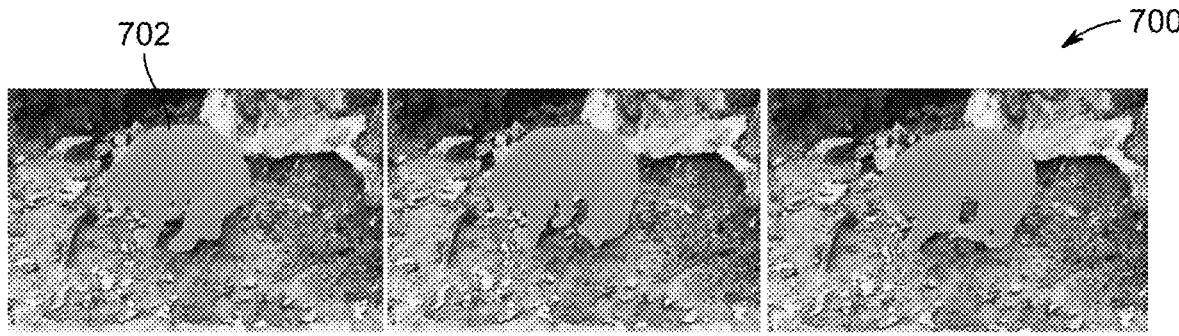
Figure 7X:
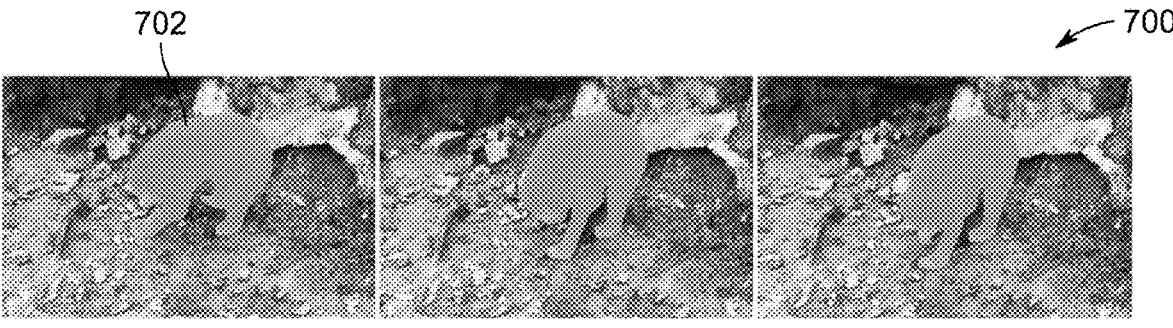

A qualitative analysis is performed based on the segmentation results obtained from the Recurrent SeqFormer in FIGS. 7, 7A-7X. The qualitative results are presented from the Youtube-VIS 2019 validation set which contains a diverse set of videos with complex object interactions. The disclosed method is able to handle such complex scenarios and produces high-quality instance masks. The qualitative results show that the disclosed method is able to effectively segment and track objects even in highly cluttered scenes. In particular, the disclosed method was able to accurately capture fine details and preserve the boundaries of objects (object masks 702), even in complex scenes with multiple objects (videos FIGS. 7A, 7B, 7E, 7F, 7G, 7H, 7I, 7J, 7K, 7L, 7Q, 7R, 7S, 7T) and cluttered backgrounds (VIDEOS FIGS. 7M, 7N, 7O, 7P). This is evident from the visual analysis of the predicted segmentation masks, where the disclosed method is able to capture intricate details of the object category instance.

Figure 8:
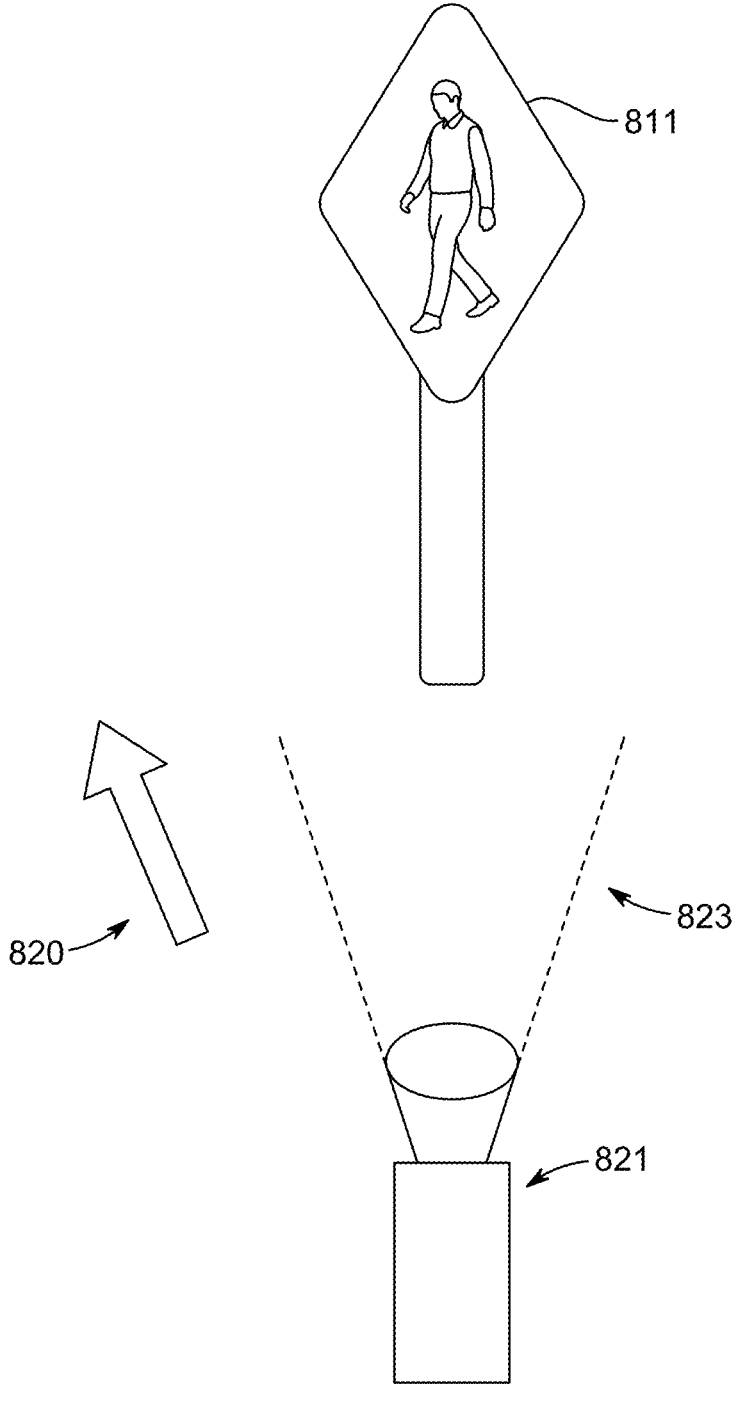
FIG. 8 illustrates a computer vision problem in the case of a road sign.

FIG. 8 illustrates a computer vision task in the case of a road sign being viewed by a camera on a moving vehicle. Road signs are often signs that display a symbol and may be displayed in positions along the side of a road or in overhead displays that cross over a road. Although the road sign itself is stationary, the vehicle, with the video camera 821 mounted thereon, is moving at a speed and direction 820 such that the sequence of images of the road sign may be obtained at different angles, at a range of distances and perspectives, over a short time period. A distance that the road sign first comes into view of the camera may be beyond the distance range of the video camera, such that initially a computer vision system may not be able to recognize the image. Also, the video camera 821 has a field of view 823, such that only partial images of the road sign 811 may be included in the video sequence. In addition, a road sign 811 may be obscured by other objects as the vehicle moves past the road sign 811. As such the video sequence obtained by the camera 821 will include a short sequence of images of the road sign at different scale, in a fast motion over a brief period of time.

Figure 9:
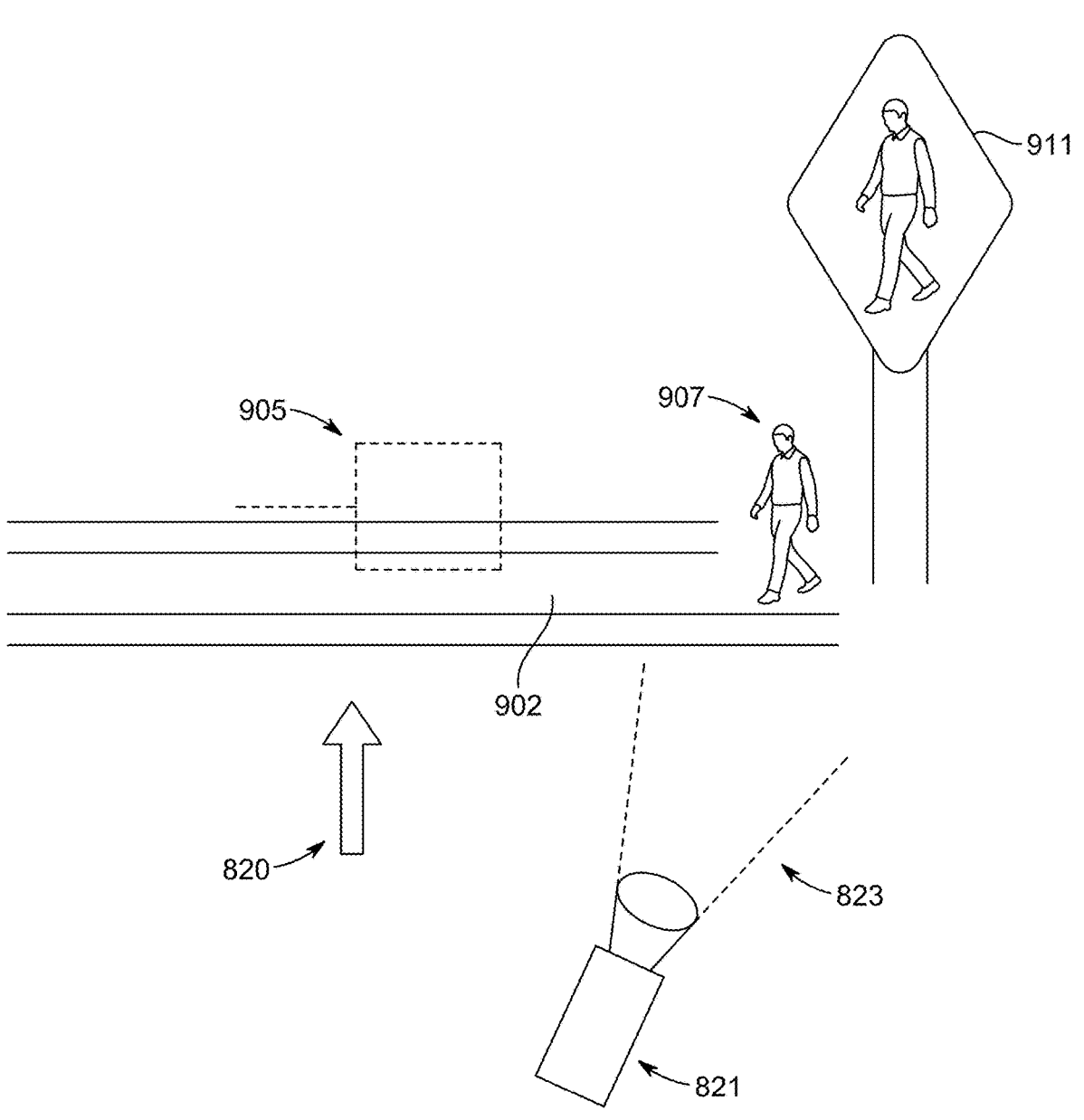
FIG. 9 illustrates a computer vision problem in the case of a pedestrian crossing a road.

FIG. 9 illustrates a computer vision task in the case of a pedestrian crossing a road while a vehicle is approaching a crosswalk. A vehicle approaching a crosswalk 902 at a speed and direction 820 may encounter a road sign 911 and a pedestrian 907 at the crosswalk 902. Again, the road sign 911 itself is stationary. The movement of the vehicle, with the video camera 821 mounted thereon, is such that the sequence of images of the road sign may be obtained at different angles, at a range of distances and perspectives, over a short time period. In addition, the computer vision system 500 obtains a sequence of images as the pedestrian moves towards the crosswalk. The computer vision system 500 must track the path 905 of the pedestrian 907 to determine if the pedestrian is entering the crosswalk 902, again within a short period of time.

The present computer vision system 500 includes at least one video camera 102 connected to a computer (ECU 300) and/or computer network. A video sequence is captured by a single video camera 102 or multiple video cameras 102. The trained recurrent SeqFormer 500 effectively captures the spatio-temporal feature relationships at the various scales across frames in a video sequence that includes the road sign and a pedestrian as the vehicle approaches and passes the road sign, and track a path of the pedestrian in the crosswalk.

Figure 10:
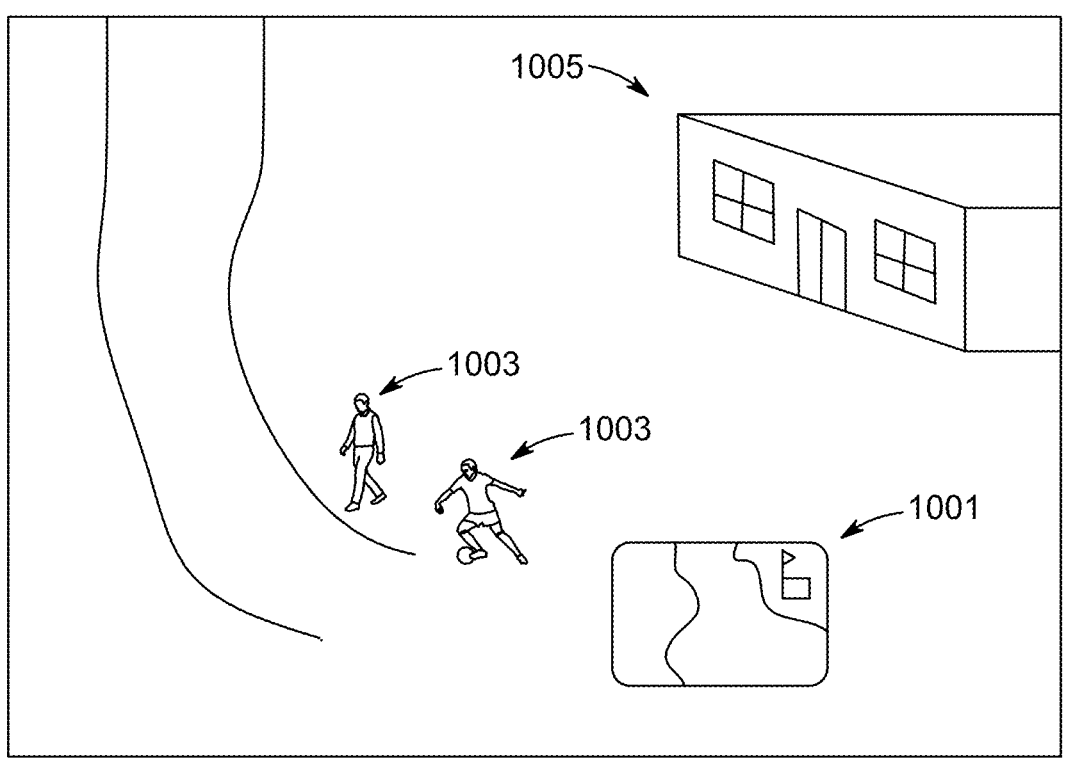
FIG. 10 illustrates a computer vision problem in the case of a group of people playing near a street.

FIG. 10 illustrates a computer vision task in the case of a group of people playing near a street. One or more vehicle cameras 102 may view a scene 1001 containing a public building, such as a school building. In a school yard in the vicinity of a school building 1005, a group of people 1003 may be playing a game. The computer vision task may include tracking movement of the group of people 1003 while the vehicle is driving by the school building 1005 based on a partial view of the school yard. For purposes of safety, the vehicle must be prepared to slow down or stop, for example, when a person 1003 moves near the road or possibly inadvertently steps into the road.

The present computer vision system 300 includes at least one video camera 102 connected to a computer 300 and/or computer network. A video sequence may be captured by a single video camera 102 or multiple video cameras 102. The video camera 102 of present recurrent SeqFormer 500 effectively captures the spatio-temporal feature relationships at the various scales across frames in a video sequence that includes the scene in which people are moving in random directions near the road, crossing paths with each other. The recurrent SeqFormer 500 can track paths of the moving people 1003 within a short period of time while the vehicle is moving along the road.

Figure 11:
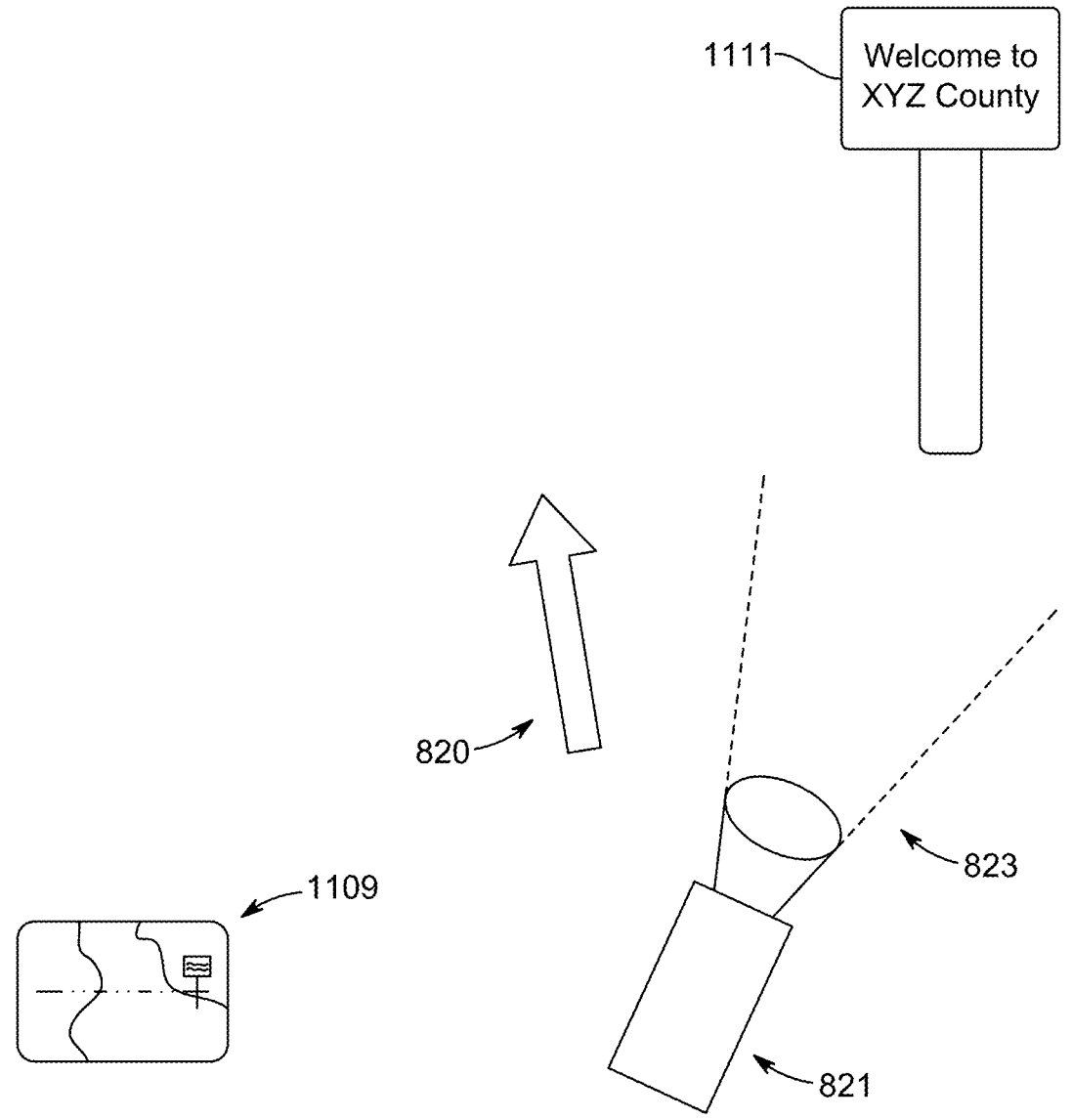
FIG. 11 illustrates a computer vision problem in the case of a road sign indicating location information.

FIG. 11 illustrates a computer vision task in the case of a road sign indicating location information. At least one vehicle camera 821 having a field of view 823 may view a scene 1109 containing a road sign 1111 that displays information of a location, or distance to a location. The computer vision system can recognize the sign including the contents of the sign, while the vehicle is moving. The recurrent SeqFormer 500 can track the sign under conditions of changing scale of the sign, while the vehicle moves relative to the sign, and subject to various angles of view and partial view of the sign.

Figure 12:
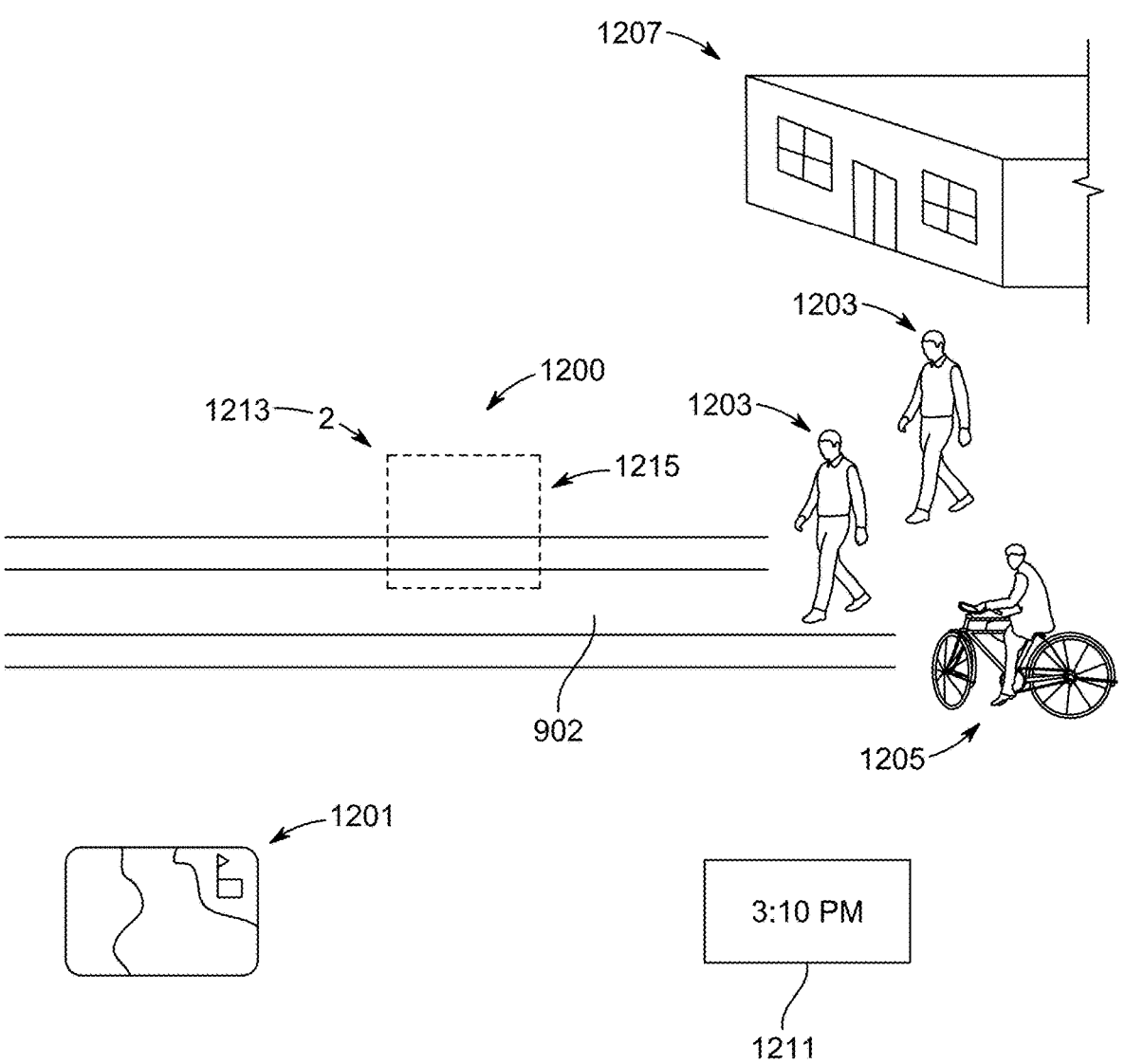
FIG. 12 illustrates a computer vision problem in which a cyclist is approaching a crosswalk.

FIG. 12 illustrates a computer vision task in which several pedestrians are walking or running at various speeds and at least one cyclist is approaching a crosswalk at a faster speed relative to the pedestrians. A vehicle camera 102 may encounter a complex scene with multiple moving objects, moving at substantially different speeds, all while the vehicle is moving. The camera view 1201 may include a partial scene that includes moving pedestrians 1203 entering and leaving the scene, as well as at least one cyclist 1205 moving at a higher rate of speed, again entering the partial scene. The scene may include a partial view of a building 1207 which complicates the background.

The present computer vision system includes at least one video camera 102 connected to a computer 300 and/or computer network. A video sequence may be captured by a single video camera 102 or multiple video cameras 102. A clock 1211 may be used to obtain a time. An external network 120 may be accessed to obtain information associated with the building 1207, including, but not limited to, traffic volume at certain time periods. When the clock time 1211 is within a certain time period, the pedestrians and cyclists that are outside the field of view of a video camera may be anticipated. The trained recurrent SeqFormer 500 effectively captures the spatio-temporal feature relationships at the various scales across frames in a video sequence that includes the pedestrians 1203 and cyclist 1205 as the vehicle approaches and passes the section of the road where the pedestrians and cyclist are approaching to cross. The recurrent SeqFormer 500 may also track the motion of the pedestrians and cyclist in a bounding box 1215, as well as the road sign, and track a path 1213 of the pedestrian across the road.

The above-described hardware description is a non-limiting example of corresponding structure for performing the functionality described herein.

Numerous modifications and variations of the present disclosure are possible in light of the above teachings. It is therefore to be understood that the invention may be practiced otherwise than as specifically described herein.

The invention claimed is:

1. A computer vision system, comprising:
a video camera to capture a sequence of video frames;
a machine learning processing engine for video instance segmentation; and a video output for outputting a sequence of mask instances,
wherein the machine learning processing engine is configured with an interchangeable encoder module,
wherein during inference, the interchangeable encoder module is configured with a recurrent encoder having a combination of convolutional and recurrent layers,
wherein the recurrent layers capture temporal relationships between the video frames, wherein during training, the interchangeable encoder module is configured with a teacher transformer encoder for training the recurrent encoder as a student through knowledge distillation;
a transformer decoder outputting video instance mask predictions; and
a segmentation block receiving the output from the transformer decoder and generates a final sequence of mask instances.

2. The computer vision system of claim 1, wherein the machine learning processing engine is further configured with a backbone neural network to extract features from the captured sequence of video frames.

3. The computer vision system of claim 2, wherein the backbone neural network generates feature maps for each video frame and passes the feature maps through separate convolution filters at different scales.

4. The computer vision system of claim 3, wherein the interchangeable encoder module is configured to receive multiple scale feature maps for each frame of the video.

5. The computer vision system of claim 1, wherein the teacher transformer encoder includes multi-scale deformable attention blocks.

6. The computer vision system of claim 1, wherein the teacher transformer encoder outputs multi-scale features for each frame.

7. The computer vision system of claim 6, wherein the transformer decoder receives the multi-scale features along with learnable instance query embeddings.

8. The computer vision system of claim 1, wherein the recurrent encoder includes a recurrent connection component and a feedforward connection component, wherein the recurrent connection component includes a convolution layer followed by a recurrent long short-term memory layer to encode temporal information within the sequence of frames.

9. The computer vision system of claim 1, wherein the training of the recurrent encoder includes training the recurrent encoder with features that are learned by the teacher transformer encoder.

10. The computer vision system of claim 9, wherein the training of the recurrent encoder is initiated after a plurality of epochs of training the teacher transformer encoder.

11. A computer vision method, comprising:
capturing, by a video camera, a sequence of video frames;
segmenting video instances in the captured video frames, by machine learning; and
outputting a sequence of mask instances,
wherein the machine learning includes:
during inference, capturing temporal relationships, by a recurrent encoder, between the video frames,
during training, training the recurrent encoder as a student through knowledge distillation using a teacher transformer encoder;
outputting, from a transformer decoder, video instance mask predictions;

receiving, by a segmentation block, an output from the transformer decoder; and generating a final sequence of mask instances.

12. The method of claim 11, further comprising extracting, by a backbone neural network, features from the captured sequence of video frames.

13. The method of claim 12, further comprising:

generating, by the backbone neural network, feature maps for each video frame; and passing the feature maps through separate convolution filters at different scales.

14. The method of claim 13, further comprising receiving, by an encoder module, multiple scale feature maps for each frame of the video.

15. The method of claim 11, wherein the teacher transformer encoder includes multi-scale deformable attention blocks.

16. The method of claim 11, further comprising outputting, by the transformer encoder, multi-scale features for each frame.

17. The method of claim 16, further comprising receiving, by the transformer decoder, the multi-scale features along with learnable instance query embeddings.

18. The method of claim 11, wherein the recurrent encoder includes a recurrent connection component and a feedforward connection component, wherein the recurrent connection component includes a convolution layer followed by a recurrent long short-term memory layer, the method further comprising encoding temporal information within the sequence of frames.

19. The method of claim 11, wherein the training of the recurrent encoder includes training the recurrent encoder with features that are learned by the teacher transformer encoder.

20. The method of claim 19, wherein the training of the recurrent encoder is initiated after a plurality of epochs of training the teacher transformer encoder.

* * * * *